US009053220B2

(12) United States Patent
Chong et al.

(10) Patent No.: US 9,053,220 B2
(45) Date of Patent: *Jun. 9, 2015

(54) METHOD, SYSTEM, AND COMPUTER PROGRAM FOR MONITORING PERFORMANCE OF APPLICATIONS IN A DISTRIBUTED ENVIRONMENT

(75) Inventors: James C. Chong, Orinda, CA (US); Joseph L. Chan, Lafayette, CA (US); Tushar M. Patel, San Francisco, CA (US); Jean Jacques Heler, Palo Alto, CA (US); Chi Hong So, Pleasant Hill, CA (US); Arthur Tsang, Walnut Creek, CA (US); Robert S. Lam, Oakland, CA (US); Raymond Chow, San Ramon, CA (US); Jerome D. Banks, San Francisco, CA (US); Christopher M. Zychowski, San Francisco, CA (US); Henry Tang, Walnut Creek, CA (US)

(73) Assignee: International Business Machines Corporation, Armonk, NY (US)

( * ) Notice: Subject to any disclaimer, the term of this patent is extended or adjusted under 35 U.S.C. 154(b) by 509 days.

This patent is subject to a terminal disclaimer.

(21) Appl. No.: 13/183,959

(22) Filed: Jul. 15, 2011
(Under 37 CFR 1.47)

(65) Prior Publication Data

US 2011/0276594 A1 Nov. 10, 2011

Related U.S. Application Data

(60) Continuation of application No. 12/236,461, filed on Sep. 23, 2008, now Pat. No. 8,037,205, which is a division of application No. 10/606,028, filed on Jun. 25, 2003, now Pat. No. 7,870,244.

(60) Provisional application No. 60/392,022, filed on Jun. 25, 2002.

(51) Int. Cl.
*G06F 15/16* (2006.01)
*G06F 11/34* (2006.01)
(Continued)

(52) U.S. Cl.
CPC ........ *G06F 11/3409* (2013.01); *G06F 11/3006* (2013.01); *G06F 11/3072* (2013.01);
(Continued)

(58) Field of Classification Search
USPC .......................................... 709/220, 219, 225
See application file for complete search history.

(56) References Cited

U.S. PATENT DOCUMENTS 5,828,833 A * 10/1998 Belville et al. .................. 726/11
5,941,947 A 8/1999 Brown et al.
(Continued)

FOREIGN PATENT DOCUMENTS

CN 1238495 12/1999
EP 0957432 A2 11/1999
(Continued)

OTHER PUBLICATIONS

Abstract and Machine Translation for JP2000122943, published on Apr. 28, 2000, Total 77 pp.
(Continued)

*Primary Examiner* — Tammy Nguyen
(74) *Attorney, Agent, or Firm* — Janaki K. Davda; Konrad, Raynes, Davda & Victor LLP

(57) ABSTRACT

A method, system, and computer program include receiving a request string, and mapping the received request string to a distinguishable request string and a collapsible request string. The received request string may be in the form of a JSP, a servlet, and remote Enterprise Java Bean calls. A user may be prompted to create rules for mapping of a received request string to a distinguishable request string and a collapsible request string.

12 Claims, 14 Drawing Sheets

(51) Int. Cl.
  *G06F 11/30* (2006.01)
  *G06F 11/32* (2006.01)
(52) U.S. Cl.
  CPC .......... *G06F11/328* (2013.01); *G06F 11/3476* (2013.01); *G06F 11/3495* (2013.01); *G06F 2201/81* (2013.01); *G06F 2201/865* (2013.01); *G06F 2201/88* (2013.01)

(56) References Cited

U.S. PATENT DOCUMENTS

| | | | |
|---|---|---|---|
| 5,958,010 | A | 9/1999 | Agarwal et al. |
| 6,023,696 | A | 2/2000 | Osborn et al. |
| 6,031,528 | A | 2/2000 | Langfahl, Jr. |
| 6,119,101 | A | 9/2000 | Peckover |
| 6,298,451 | B1 * | 10/2001 | Lin ............... 714/4.2 |
| 6,321,263 | B1 | 11/2001 | Luzzi et al. |
| 6,438,573 | B1 | 8/2002 | Nilsen |
| 6,446,028 | B1 | 9/2002 | Wang |
| 6,453,269 | B1 * | 9/2002 | Quernemoen ........ 702/186 |
| 6,470,383 | B1 | 10/2002 | Leshem et al. |
| 6,606,658 | B1 * | 8/2003 | Uematsu ........ 709/225 |
| 6,633,908 | B1 | 10/2003 | Leymann et al. |
| 6,658,471 | B1 | 12/2003 | Berry et al. |
| 6,701,363 | B1 | 3/2004 | Chiu et al. |
| 6,711,739 | B1 | 3/2004 | Kutcher |
| 6,785,728 | B1 | 8/2004 | Schneider et al. |
| 7,127,743 | B1 | 10/2006 | Khanolkar et al. |
| 7,272,613 | B2 | 9/2007 | Sim et al. |
| 7,277,938 | B2 | 10/2007 | Duimovich et al. |
| 7,383,332 | B2 | 6/2008 | Chong et al. |
| 7,415,537 | B1 | 8/2008 | Maes |
| 7,607,121 | B2 | 10/2009 | Chow et al. |
| 7,685,224 | B2 * | 3/2010 | Nye ............... 709/201 |
| 7,725,529 | B2 * | 5/2010 | Yang et al. ........ 709/203 |
| 7,757,214 | B1 * | 7/2010 | Palczak et al. ....... 717/121 |
| 7,840,635 | B2 | 11/2010 | Chan |
| 7,844,594 | B1 * | 11/2010 | Holt et al. .......... 707/709 |
| 7,870,244 | B2 | 1/2011 | Chong et al. |
| 7,945,804 | B2 * | 5/2011 | Jacobowitz et al. ...... 713/501 |
| 7,953,848 | B2 | 5/2011 | Chong et al. |
| 8,037,205 | B2 | 10/2011 | Chong et al. |
| 8,090,851 | B2 | 1/2012 | Chong et al. |
| 8,234,128 | B2 * | 7/2012 | Martucci et al. .......... 705/3 |
| 8,341,650 | B1 * | 12/2012 | Veerabhadraiah ...... 719/320 |
| 8,443,056 | B2 * | 5/2013 | Hunt ............... 709/219 |
| 2001/0034771 | A1 | 10/2001 | Hutsch et al. |
| 2002/0038331 | A1 | 3/2002 | Flavin |
| 2002/0042896 | A1 | 4/2002 | Johnson et al. |
| 2002/0054169 | A1 | 5/2002 | Richardson |
| 2002/0054269 | A1 | 5/2002 | Maeda et al. |
| 2002/0054587 | A1 | 5/2002 | Baker et al. |
| 2002/0087518 | A1 | 7/2002 | Ellis et al. |
| 2002/0120663 | A1 | 8/2002 | Binns |
| 2002/0120727 | A1 | 8/2002 | Curley et al. |
| 2002/0165999 | A1 | 11/2002 | Hardin et al. |
| 2003/0004987 | A1 | 1/2003 | Glanzer et al. |
| 2003/0014464 | A1 | 1/2003 | Deverill et al. |
| 2003/0065764 | A1 | 4/2003 | Capers et al. |
| 2003/0115509 | A1 | 6/2003 | Dubal |
| 2003/0182463 | A1 | 9/2003 | Valk |
| 2004/0226013 | A1 | 11/2004 | Mariotti et al. |
| 2006/0167929 | A1 | 7/2006 | Chakraborty et al. |
| 2006/0170967 | A1 | 8/2006 | Maki et al. |
| 2007/0156669 | A1 | 7/2007 | Marchisio et al. |
| 2012/0047255 | A1 | 2/2012 | Chong et al. |

FOREIGN PATENT DOCUMENTS

| | | |
|---|---|---|
| EP | 1134658 | 9/2001 |
| JP | 7129438 | 5/1995 |
| JP | 2000122943 | 4/2000 |
| JP | 2000222255 | 8/2000 |
| JP | 2000242530 | 9/2000 |
| JP | 2000250833 | 9/2000 |
| JP | 2000315198 | 11/2000 |
| JP | 2002041331 | 2/2002 |
| JP | 2002082926 | 3/2002 |
| JP | 2002099448 | 4/2002 |
| KR | 2001-0079612 | 8/2001 |
| WO | 99/15950 | 4/1999 |
| WO | 00/08806 | 2/2000 |
| WO | 03/087982 | 10/2003 |

OTHER PUBLICATIONS

English Abstract and Machine Translation for JP2000222255, published on Aug. 11, 2000, Total 16 pp.
English Abstract and Machine Translation for JP2000242530, published on Sep. 8, 2000, Total 9 pp.
Abstract and Machine Translation for JP2000250833, published on Sep. 14, 2000, Total 17 pp.
Abstract and Machine Translation for JP2000315198, published on Nov. 14, 2000, Total 42 pp.
Abstract and Machine Translation for JP2002041331, published on Feb. 8, 2002, Total 8 pp.
Abstract and Machine Translation for JP2002082926, published on Mar. 22, 2002, Total 36 pp.
Abstract and Machine Translation for JP2002099448, published on Apr. 5, 2002, Total 28 pp.
Chinese Office Action & Translation, Oct. 30, 2009, for Application No. 038148773, Total 11 pp.
IDS Report, Sep. 30, 2009, from the Sep. 15, 2009 Office Action for JP2004-516267, Total 1 p.
IDS Report, Jun. 8, 2010, from the Jun. 1, 2010 Office Action for SVL920040552JP1, Total 1 p.
Japanese Office Action & Translation, Sep. 15, 2009, for Application No. JP2004-516267, Total 5 pp.
Nikkei Internet Technology, "Four Points Essential for Making Web Applications Succeed", Nikkei Internet Technologies, Nikkei Business Publications, Inc., Oct. 22, 2001, Issue 52, Total 10 pp [in Japanese & English Abstract].
Shirato, D., "Evaluation of Application Types, and Providing Highly Effective Responses", Nikkei Open System, Nikkei Business Publications, Inc., Mar. 15, 2002, Issue 108, Total 10 pp [in Japanese & English Abstract].
Shirato, D., "Selecting Appropriate Functions for Performance, Operation, and Implementation Cost Requirements", Nikkei Open System, Nikkei Business Publications, Inc., Oct. 15, 2001, Issue 103, Total 10 pp [in Japanese & English Abstract].
Notice of Allowance 2, Jul. 6, 2011, for U.S. Appl. No. 11/847,217, filed on Aug. 29, 2007 by J.C. Chong et al., Total 33 pp. [72.49D1 (NOA2)].
Bauer et al., "Reference Architecture for Distributed Systems Management", IBM Systems Journal, 1994, vol. 33, pp. 426-444, Total 19 pp.
International Preliminary Examination Report, Feb. 17, 2005, for International Application No. PCT/US03/20109, Total 4 pp.
International Preliminary Report on Patentability, Oct. 17, 2006, for International Application No. PCT/US04/26597, Total 43 pp.
International Search Report, Nov. 24, 2004, for International Application No. PCT/US03/20109, Total 6 pp.
International Search Report, Oct. 23, 2003, for International Application No. PCT/US03/10459, Total 6 pp.
International Search Report and Written Opinion, Jun. 7, 2005, for International Application No. PCT/US04/26597, Total 10 pp.
Supplementary European Search Report, Jan. 17, 2006, for International Application No. PCT/US03/20109, Total 6 pp..
Response to Written Opinion and Request for Correction of Description of Drawings, Aug. 5, 2005, for International Application No. PCT/US04/26597, Total 41 pp.
Patent Abstract for KR2001-0079612, published on Aug. 22, 2001, Total 1 p.
Final Office Action 1, May 18, 2007, for U.S. Appl. No. 10/409,415, filed on Apr. 8, 2003 by J.C. Chong et al., Total 18 pp. [72.49 (FOA1)].
Final Office Action 1, Aug. 19, 2009, for U.S. Appl. No. 11/847,217, filed on Aug. 29, 2007 by J.C. Chong et al., Total 12 pp. [72.49D1 (FOA1)].

(56) References Cited

OTHER PUBLICATIONS

Final Office Action 1, Dec. 31, 2007, for U.S. Appl. No. 10/606,028, filed on Jun. 25, 2003 by J.C. Chong et al., Total 25 pp. [72.50 (FOA1)].
Final Office Action 1, May 23, 2008, for U.S. Appl. No. 10/919,674, filed on Aug. 16, 2004 by J.L.C. Chan, Total 17 pp. [72.51 (FOA1)].
Notice of Allowance 1, Oct. 16, 2007, for U.S. Appl. No. 10/409,415, filed on Apr. 8, 2003 by J.C. Chong et al., Total 14 pp. [72.49 (NOA)].
Notice of Allowance 1, May 18, 2009, for U.S. Appl. No. 12/235,545, filed on Sep. 22, 2008 by J.C. Chong et al., Total 28 pp. [72.50C1 (NOA1)].
Notice of Allowance 1, Nov. 19, 2008, for U.S. Appl. No. 10/919,674, filed on Aug. 16, 2004 by J.L.C. Chan, Total 4 pp. [72.51 (NOA1)].
Notice of Allowance 2, Nov. 20, 2007, for U.S. Appl. No. 10/409,415, filed on Apr. 8, 2003 by J.C. Chong et al., Total 10 pp. [72.49 (NOA2)].
Notice of Allowance 2, May 5, 2009, for U.S. Appl. No. 10/919,674, filed on Aug. 16, 2004 by J.L.C. Chan, Total 13 pp. [72.51 (NOA2)].
Notice of Allowance 3, Jan. 28, 2008, for U.S. Appl. No. 10/409,415, filed on Apr. 8, 2003 by J.C. Chong et al., Total 10 pp. [72.49 (NOA3)].
Notice of Allowance 3, Oct. 19, 2009, for U.S. Appl. No. 10/919,674, filed on Aug. 16, 2004 by J.L.C. Chan, Total 8 pp. [72.51 (NOA3)].
Notice of Allowance 4, Jan. 29, 2010, for U.S. Appl. No. 10/606,028, filed on Jun. 25, 2003 by J.C. Chong et al., Total 16 pp. [72.50 (NOA4)].
Notice of Allowance 4, Jan. 29, 2010, for U.S. Appl. No. 10/919,674, filed on Aug. 16, 2004 by J.L.C. Chan, Total 10 pp. [72.51 (NOA4)].
Office Action 1, Dec. 7, 2006, for U.S. Appl. No. 10/409,415, filed on Apr. 8, 2003 by J.C. Chong et al., Total 11 pp. [72.49 (OA1)].
Office Action 1, Feb. 26, 2009, for U.S. Appl. No. 11/847,217, filed on Aug. 29, 2007 by J.C. Chong et al., Total 24 pp. [72.49D1 (OA1)].
Office Action 1, Jun. 5, 2007, for U.S. Appl. No. 10/606,028, filed on Jun. 25, 2003 by J.C. Chong et al., Total 17 pp. [72.50 (OA1)].
Office Action 1, Nov. 15, 2007, for U.S. Appl. No. 10/919,674, filed on Aug. 16, 2004 by J.L.C. Chan, Total 20 pp. [72.51 (OA1)].
Office Action 3, Feb. 3, 2010, for U.S. Appl. No. 11/847,217, filed on Aug. 29, 2007 by J.C. Chong et al., Total 16 pp. [72.49D1 OA3)].
Supplemental Notice of Allowance, Sep. 26, 2008, for U.S. Appl. No. 10/606,028, filed on Jun. 25, 2003 by J.C. Chong et al., Total 6 pp. [72.50 (SuppNOA)].
Supplemental Notice of Allowability, Jun. 8, 2009, for U.S. Appl. No. 12/235,545, filed on Sep. 22, 2008 by J.C. Chong et al., Total 11 pp. [72.50C1 (SuppNtcAllowability)].
Translation for Japanese First Office Action dated Mar. 25, 2008, for U.S. Appl. No. 10/409,415, Total 2 pp.
Translation for Japanese Second Office Action dated Aug. 1, 2008, for U.S. Appl. No. 10/409,415, Total 1 p.
Japanese First Office Action dated Mar. 25, 2008, for U.S. Appl. No. 10/409,415, Total 4 pp.
Japanese Second Office Action dated Aug. 1, 2008, for U.S. Appl. No. 10/409,415, Total 3 pp.
Supplementary European Search Report, Oct. 27, 2008, for EP03718216.9, Total 3 pp.
Final Office Action 1, Dec. 30, 2010, for U.S. Appl. No. 12/236,461, filed on Sep. 23, 2008 by J.C. Chong et al., Total 12 pp. [72.50D1 (FOA1)].
Notice of Allowance 1, Jun. 26, 2008, for U.S. Appl. No. 10/606,028, filed on Jun. 25, 2003 by J.C. Chong et al., Total 15 pp. [72.50 (NOA1)].
Notice of Allowance 1, Jan. 21, 2011, for U.S. Appl. No. 12/108,469, filed on Apr. 23, 2008 by J.C. Chong et al., Total 12 pp. [72.49C1 (NOA1)].
Notice of Allowance 1, Jun. 1, 2010, for U.S. Appl. No. 11/847,217, filed on Aug. 29, 2007 by J.C. Chong et al., Total 10 pp. [72.49D1 (NOA1)].
Notice of Allowance 2, Dec. 2, 2008, for U.S. Appl. No. 10/606,028, filed on Jun. 25, 2003 by J.C. Chong et al., Total 22 pp. [72.50 (NOA2)].
Notice of Allowance 3, Oct. 15, 2009, for U.S. Appl. No. 10/606,028, filed on Jun. 25, 2003 by J.C. Chong et al., Total 7 pp. [72.50 (NOA3)].
Notice of Allowance 5, May 18, 2010, for U.S. Appl. No. 10/606,028, filed on Jun. 25, 2003 by J.C. Chong et al., Total 7 pp. [72.50 (NOA5)].
Notice of Allowance 5, Jul. 13, 2010, for U.S. Appl. No. 10/919,674, filed on Aug. 16, 2004 by J.L.C. Chan, Total 11 pp. [72.51 (NOA5)].
Notice of Allowance 6, Aug. 27, 2010, for U.S. Appl. No. 10/606,028, filed on Jun. 25, 2003 by J.C. Chong et al., Total 8 pp. [72.50 (NOA6)].
Office Action 1, Jun. 28, 2010, for U.S. Appl. No. 12/108,469, filed on Apr. 23, 2008 by J.C. Chong et al., Total 43 pp. [72.49C1 (OA1)].
Office Action 1, Jun. 28, 2010, for U.S. Appl. No. 12/236,461, filed on Sep. 23, 2008 by J.C. Chong et al., Total 39 pp. [72.50D1 (OA1)].
Notice of Allowance 1, Jun. 7, 2011, for U.S. Appl. No. 12/236,461, filed on Sep. 23, 2008 by J.C. Chong et al., Total 17 pp. [72.50D1 (NOA1)].
U.S. Appl. No. 12/235,545, filed Sep. 22, 2008, entitled "System and Computer Program for Monitoring Performance of Applications in Distributed Environment", invented by J.C. Chong, J.L. Chan, T.M. Patel, J. Heler, C.H. So, A. Tsang, R.S. Lam, R. Chow, H. Tang, J. Banks, and C.M. Zychowski, 50 pp. [72.50C1 (Appln)].
Abstract for CN1238495A, published Dec. 15, 1999, 1 p [Abstract for corresponding case EP0957432A2].
Abstract and Machine Translation for JP7129438, published on May 19, 1995, Total 22 pp.
Office Action 1 for U.S. Appl. No. 13/287,037, dated Sep. 11, 2013, 29 pp. [72.49D2 (OA1)].
Response to Office Action 1, dated Dec. 11, 2013, for U.S. Appl. No. 13/287,037, 9 pp. [72.49D2 (ROA1)].
Notice of Allowance 1, Feb. 20, 2014, for U.S. Appl. No. 13/287,037, filed on Nov. 1, 2011 by James C. Chong et al., Total 11 pp. [NOA2 (72.49D2)].
Notice of Allowance 3, Nov. 7, 2014, for U.S. Appl. No. 13/287,037, filed on Nov. 1, 2011 by J.C. Chong et al., Total 9 pp. [72.49D2 (NOA3)].
Notice of Allowance 2, Sep. 12, 2014, for U.S. Appl. No. 13/287,037, filed on Nov. 1, 2011 by J.C. Chong et al., Total 10 pp. [72.49D2 (NOA2)].

\* cited by examiner

METHOD, SYSTEM, AND COMPUTER PROGRAM FOR MONITORING PERFORMANCE OF APPLICATIONS IN A DISTRIBUTED ENVIRONMENT

RELATED APPLICATIONS

This application is a continuation application of and claims the benefit of U.S. application Ser. No. 12/236,461, filed Sep. 23, 2008, and entitled "METHOD, SYSTEM, AND COMPUTER PROGRAM FOR MONITORING PERFORMANCE OF APPLICATIONS IN A DISTRIBUTED ENVIRONMENT", which is a divisional application of and claims the benefit of U.S. Pat. No. 7,870,244, having application Ser. No. 10/606,028, filed Jun. 25, 2003, and entitled "MONITORING PERFORMANCE OF APPLICATIONS IN A DISTRIBUTED ENVIRONMENT", which claims the benefit of U.S. Provisional Patent Application No. 60/392,022, filed Jun. 25, 2002, the contents of each of which is incorporated herein by reference in its entirety.

FIELD OF THE INVENTION

This invention relates to computer software, and in particular to distributed computing.

BACKGROUND OF THE INVENTION

Business-critical applications are currently hosted on distributed servers using Sun Microsystems Java 2 Enterprise Edition (J2EE) technologies. Such applications include servers providing key business operations directly to customers running browser clients. A variety of tools and techniques are available to monitor the performance of various components of such systems, including databases, platforms, and hardware. However, the performance experienced by the customer is not the performance of such underlying components, but the performance of the application. The inventors have identified a key failure in the prior art to provide information on the performance of the application.

As a result of the inability of prior art products to measure performance of the application, decisions about selections of hardware and software may be ill-informed. For example, if an application is responding slowly, one option available to managers is to purchase or lease additional servers on which the application runs. Such purchases are expensive, and the installation of new hardware employs information technology personnel who are necessarily diverted from other tasks. Other responses to an application responding slowly include changing of configurations of various hardware. However, numerous different combinations of various hardware and software configurations may need to be tried in order to improve application performance.

SUMMARY OF THE INVENTION

A method in accordance with the invention for monitoring the performance of applications running on a server in a distributed computing environment comprises the step of prompting the user to select information for monitoring, monitoring application performance in accordance with the selected information, and making the monitored performance information available to the user.

A method in accordance with the invention includes the steps of prompting a user to select a server or server group, a resource, and a threshold or condition for notification, comparing the value or quality of the parameter to the threshold or condition, and providing a notification to the user in the event that the parameter reaches the threshold or condition.

A method according to the invention comprises the steps of providing the user with performance information relating to applications running on a server in a distributed computing environment, receiving from the user a request for more specific performance information, and providing more detailed performance information in response to the request.

A method according to the invention includes the steps of receiving from the user an identification of a server as an authoritative server, another server as a comparison server, comparing runtime environment data in the form of one or more of CPU data, server data and Java data between the selected servers, and displaying differences to a user.

A method of the invention includes the steps of receiving from the user an identification of a server as an authoritative server, and another server as a comparison server, and providing a list of matching and differing file names. The method may further include the step of receiving from the user a selection of a file, conducting a comparison of the files, and providing a result to the user.

A method of the invention includes the steps of receiving a request string, and mapping the received request string to a distinguishable request string and a collapsible request string. The received request string may be in the form of a JSP, a servlet, and remote Enterprise Java Bean calls. A method of the invention may prompt a user to create rules for mapping of a received request string to a distinguishable request string and a collapsible request string.

A method of the invention includes the steps of providing, in a system running at least one application, a management application having various components for monitoring and management, and monitoring and providing to a user in real-time information concerning configuration of the components and the relationships between the components.

A method of the invention includes the steps of assigning a role to each user, and mapping between access to functions and each user role by an access control list, whereby access to functions is limited depending on the assigned role of the user.

A system in accordance with the invention for monitoring the performance of applications running on a server in a distributed computing environment includes computer hardware and software for prompting the user to select information for monitoring, computer hardware and software for monitoring application performance in accordance with the selected information received from the user, and computer hardware and software for making the monitored performance information available to the user.

A system in accordance with the invention includes computer hardware and software for prompting a user to select a server or server group, a resource, and a threshold or condition for notification, computer software and hardware for comparing a value or quality of a monitored parameter of the resource on the server or server group to the threshold or condition, and computer software and hardware for providing a notification to the user in the event that the parameter reaches the threshold or condition.

A system according to the invention includes computer hardware and software for providing the user with performance information relating to one or more applications running on a server in a distributed computing environment, computer hardware and software for receiving from the user a request for more specific performance information, and computer hardware and software for providing more detailed performance information in response to the request.

A system according to the invention includes computer hardware and software for receiving from a user an identification of a first server as an authoritative server and a second server as a comparison server, computer hardware and software for comparing runtime environment data from the authoritative server and the comparison server in the form of one or more of CPU data, server data and Java data between the selected servers, and computer hardware and software for displaying differences in such data between the selected servers to a user.

A system according to the invention includes computer hardware and software for receiving from the user an identification of a first server as an authoritative server and a second server as a comparison server, and computer hardware and software for providing a list of matching and differing file names. The system may further include computer hardware for receiving from the user a selection of a file on both the authoritative server and the comparison server, computer hardware and software for conducting a comparison of the files, and for providing a result to the user.

A system of the invention includes computer hardware and software for receiving a request string, and computer hardware and software for mapping the received request string to a distinguishable request string and a collapsible request string. The received request string may be in the form of a JSP, a servlet, and remote Enterprise Java Bean calls. A system of the invention may include computer hardware and software for prompting a user to create rules for mapping of a received request string to a distinguishable request string and a collapsible request string.

A system of the invention includes computer hardware and software for providing, in a system running at least one application, a management application having various components for monitoring and management, and for monitoring and providing to a user in real-time information concerning configuration of the components and the relationships between the components.

A system of the invention includes computer hardware and software for assigning a role to each user, and computer hardware and software for mapping between access to functions and each user role by an access control list, whereby access to functions is limited depending on the assigned role of the user.

A computer program in accordance with the invention for monitoring the performance of applications running on a server in a distributed computing environment, consists of instructions stored on a medium, which instructions, when executed on a processor, cause the processor to execute the steps of prompting the user to select information for monitoring, monitoring application performance in accordance with the selected information, and making the monitored performance information available to the user.

A computer program in accordance with the invention consists of instructions stored on a medium, which instructions, when executed on a processor, cause the processor to execute the steps of prompting a user to select a server or server group, a resource, and a threshold or condition for notification, comparing a detected value or quality of a parameter of the resource on the server or server group to the threshold or condition, and providing a notification to the user in the event that the parameter reaches the threshold or condition.

A computer program according to the invention consists of instructions stored on a medium, which instructions, when executed on a processor, cause the processor to execute the steps of providing the user with performance information relating to applications running on a server in a distributed computing environment, receiving from the user a request for more specific performance information, and providing more detailed performance information in response to the request.

A computer program according to the invention consists of instructions stored on a medium, which instructions, when executed on a processor, cause the processor to execute the steps of receiving from the user an identification of a first server as an authoritative server, a second server as a comparison server, comparing runtime environment data in the form of one or more of CPU data, server data and Java data between the selected servers, and displaying differences to a user.

A computer program according to the invention consists of instructions stored on a medium, which instructions, when executed on a processor, cause the processor to execute the steps of receiving from a user an identification of a first server as an authoritative server, and a second server as a comparison server, and providing a list of matching and differing file names between the first and second servers. The program may further include instructions which, when executed on a processor, cause the processor to execute the steps of receiving from the user a selection of a file found on both the first and second servers, conducting a comparison of the files, and providing a result to the user.

A computer program of the invention consists of instructions stored on a medium, which instructions, when executed on a processor, cause the processor to execute the steps of receiving a request string, and mapping the received request string to a distinguishable request string and a collapsible request string. The received request string may be in the form of a JSP, a servlet, and remote Enterprise Java Bean calls.

A computer program of the invention consists of instructions stored on a medium, which instructions, when executed on a processor, causing the processor to execute the steps of providing, in a system running at least one application, a management application having various components for monitoring and management, and monitoring and providing to a user in real-time information concerning configuration of the components and the relationships between the components.

A computer program of the invention consists of instructions stored on a medium, which instructions, when executed on a processor, cause the processor to execute the steps of assigning a role to each user, and mapping between access to functions and each user role by an access control list, whereby access to functions is limited depending on the assigned role of the user.

DETAILED DESCRIPTION

The invention includes a process for monitoring and providing information about the performance of certain aspects of computer systems, and computer programs and systems for accomplishing these purposes. The method and system will be described with reference to a computer program for accomplishing these purposes and for use in a system of the invention. The computer program of the invention is particularly useful for applications running on application servers. The computer program of the invention includes a user interface providing a variety of information and options to the user. Probes installed on application servers obtain information related to the operation of the applications and servers and furnish that information to other program elements for analysis and reporting to the user.

Monitoring Levels and Schedule

Figure 1:
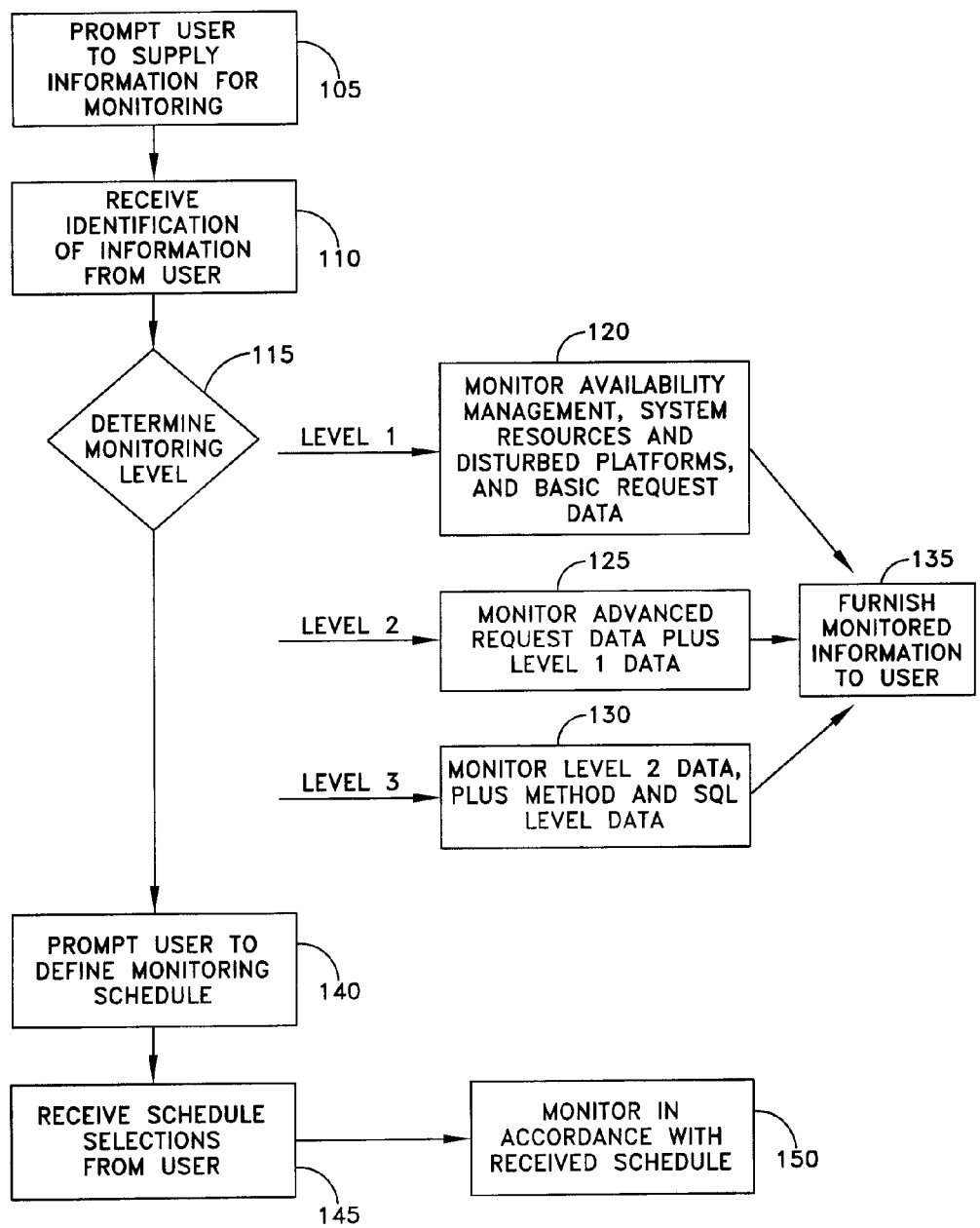
FIG. 1 is a flow diagram illustrating a method in accordance with the invention.

In a method, system and computer program in accordance with the invention, there is provided a capability for providing selected levels of detail about the operation of applications running on a server. A user is prompted to identify information for monitoring, as indicated in FIG. 1 at 105. A user is preferably provided with at least two choices as to the level of detail of monitoring. The term level of detail of monitoring refers to the amount and nature of information that is obtained about the running of the applications. The level of detail of monitoring may refer to the amount of data or information that is being obtained. The level of detail may also refer to the nature of the information that is being obtained. For example, some types of information, such as server availability information, are at a relatively high level of detail. Other types of information, such as method trace information, are at a relatively low level of detail.

The user may be prompted to select a level of monitoring. The user may select particular features to monitor. Alternatively, preselected monitoring levels may be provided. Each preselected monitoring level has associated therewith particular information that is monitored and reported. Upon receiving from a user a selection of a monitoring level or particular features, as indicated at block 110 of FIG. 1, the program of the invention monitors application performance, as indicated, and makes the monitored performance information available to the user. In one example, illustrated in FIG. 1, three levels of monitoring may be provided. Upon receipt of the request from the user, the system determines the monitoring level, as indicated by decision block 115. At Level 1, the highest level, and therefore the level providing the least information, the information may be in the nature of request level data and server level data. For example, the associated information may be availability management, system resources and distributed platforms, and basic request data, as indicated at block 120. Availability management includes information as to whether a particular application is running on a particular server. System resources indicates such information as the amount of available memory and number of available connections. Basic request data indicates the number of requests being made, the number of requests being completed, and the like.

In the same example, the user may be provided with a selection of Level 2 monitoring. A Level 2 monitoring selection ordinarily include all of the information provided by Level 1 monitoring, with additional information, as indicated at block 125. The additional information may be API level data, such as SQL data, JMS data and EJB call data. Such data may include data regarding the throughput of a particular CPU. The functionality to permit the user to provide a soft cancel of a request may be provided. No method data or SQL level data is provided. In order to provide the additional data, the JVMPI is enabled on the corresponding JVMs. This level is directed at problem determination, and may be used for servers with a high volume of transactions, with occasional instability. The complexity of the transactions may vary. Because the JVMPI is enabled on the corresponding JVM, the user may be provided with the option of changing dynamically to a more detailed level of monitoring, such as Level 3 described below.

In the same example, the user may be provided with a selection of Level 3 monitoring. Level 3 monitoring provides the information furnished in connection with Level 2 monitoring, plus method level data. Level 3 may include advanced problem determination and reporting, including, for example, method and SQL level data, as indicated by block 130. The JVMPI is enabled on the corresponding JVMs. JVMPI function calls are possible, and method entry and exit events are selected. This level is typically used for servers which have been selected for diagnostics, detailed workload characterization and profiling. Since this level requires enabling of the JVMPI, as noted above, it is possible to dynamically change between this level and other levels in which the JVMPI has been enabled, such as the exemplary Level 2 described above. In all cases, as noted above, and as indicated by block 135, monitored information is presented to the user.

In a preferred embodiment, the user is prompted to define a schedule for monitoring, as indicated by block 140. The schedule is received from the user, as indicated by block 145, and monitoring proceeds in accordance with the schedule as indicated by block 150. A schedule defines at least a start time, preferably defined by calendar date and time, a monitoring level, and a server or group of servers. Rather than a monitoring level, the program of the invention could permit the user to select individual data items for monitoring. The schedule may define times for the monitoring level to change, which may also be in terms of a calendar date and time. The schedule may be selected to cycle on an appropriate basis, such as each month, each week, or each day. In a preferred embodiment, a schedule consists of a group of schedule records, each of which is a combination of a start date and time and a monitoring level. The program of the invention causes monitoring to commence with the first schedule record, and monitoring to change when the current time is the start time and date of another schedule record. This process continues through successive schedule records. A default monitoring level may be provided for use at a time when no monitoring is specified in the schedule. The program may be furnished with a default, which may be changed by the user. The user is prompted to apply a completed schedule to one or more servers or server groups. The user may be provided the option to duplicate an existing schedule, and then be prompted for servers and server groups to which to apply the schedule. The user may be provided the option of modifying the fields of a schedule. Preferably, if a schedule is modified by removal of a server or server group, the user will be prompted to apply another schedule to that server or server group. The program may be configured to prevent the user from removing all schedules from a given server. Alternatively, upon removal of all schedules from a given server or group, monitoring of the affected server or server groups may return to a default monitoring level. The user may be provided the option of deleting a schedule, and monitoring may take place at a default level for the time and server or server groups corresponding to the deleted schedule.

While a programmed monitoring level, with the items to be monitored pre-selected, may be used, a system of the invention may permit a user with proper authorization to manually change the items to be monitored. Such a manual change would preferably only be available on a temporary basis, and may be limited to a particular server or server group.

If a server is restarted, the system follows a hierarchical search path to determine the proper level of monitoring. If it is possible to contact the scheduler, ask for a temporary override, and then a scheduled monitoring level, then the system-wide monitoring level is used. When the scheduler cannot be contacted, then the default monitoring level is used.

Monitoring Traps and Alerts

Figure 2A:
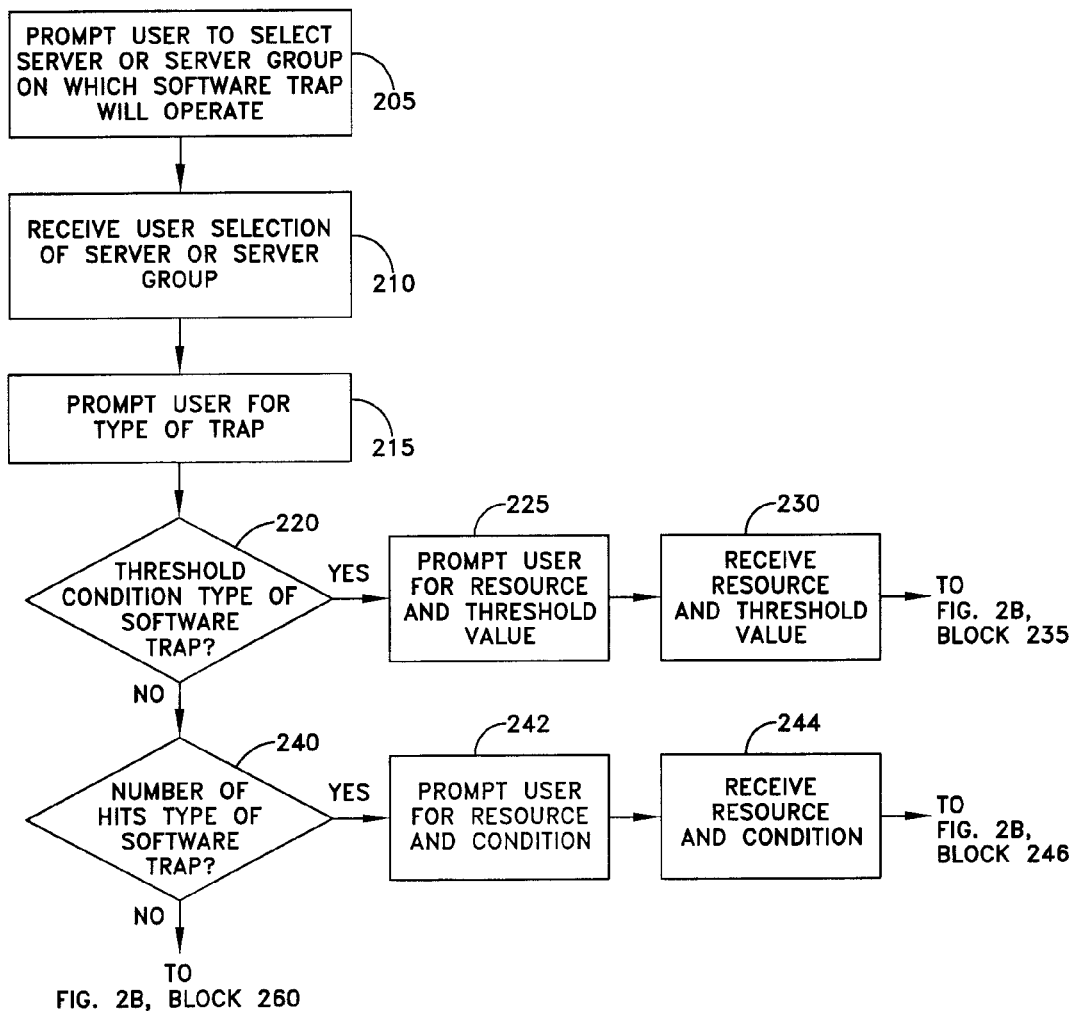
FIGS. 2A and 2B is a flow diagram illustrating a method in accordance with the invention.
Figure 2B:
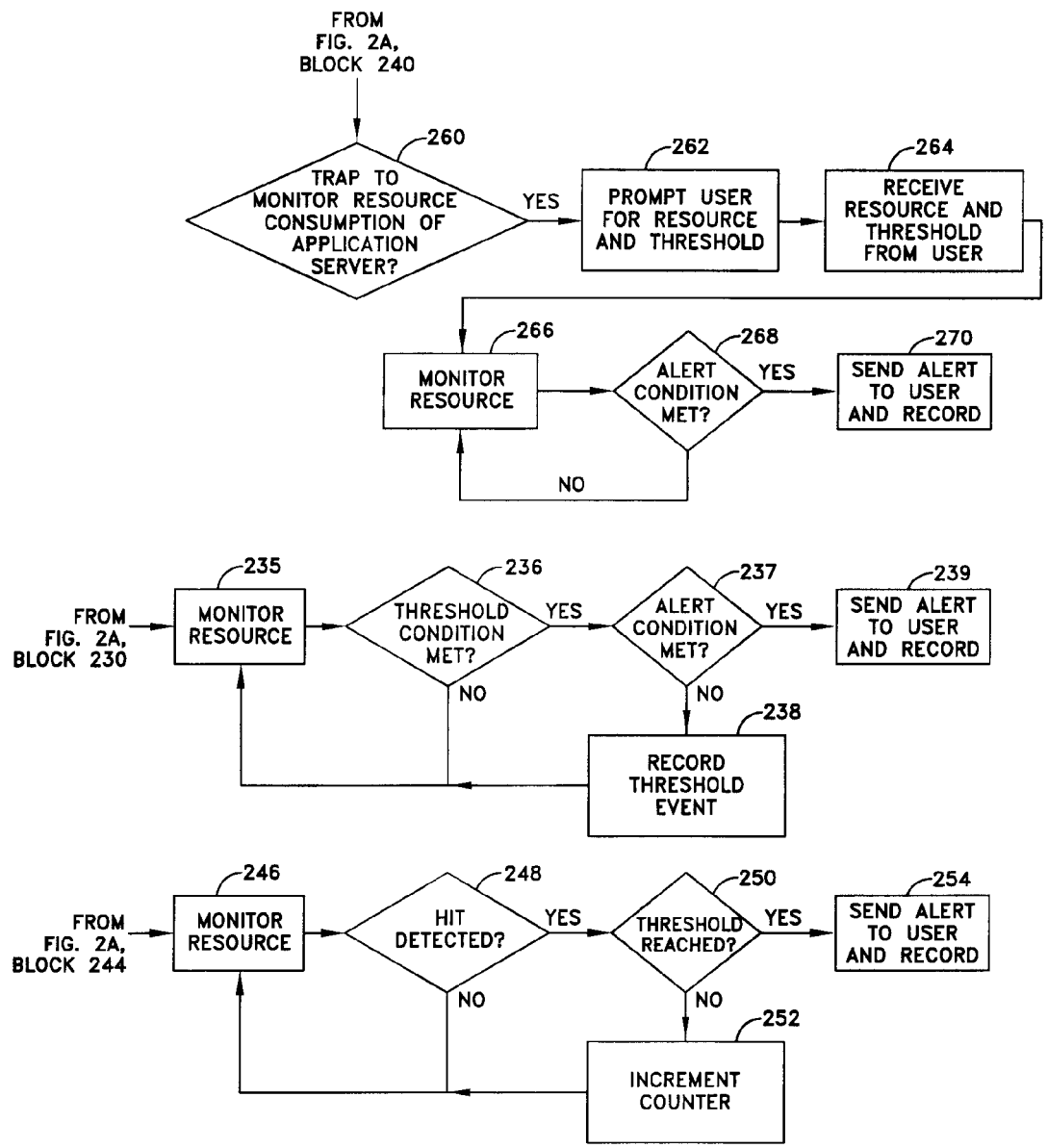

In a method, system and computer program according to the invention, while monitoring of a server is taking place, alerts are provided to the user. Alerts are provided as a result of a parameter of a monitored resource on a selected server or server group reaching a selected matching condition or threshold value for that condition. The software that is capable of providing a notification or alert to the user is referred to here as a software trap. The user may select the option of creating or modifying a software trap from a menu in a program according to the invention. There are a number of selections which a user is prompted to make in order to create a new software trap. These selections include the servers or server groups on which the trap will be applied, the resource to be measured, and the condition. As indicated in the example of FIG. 2, the first step may be to prompt the user to select a server or server group, as indicated at block 205. The selection is received, as indicated by block 210.

The information required varies with the type of trap, and the user is prompted for the type of trap, as indicated at block 215.

For a first type of trap, as indicated in decision block 220 and block 225, a resource and a condition in the form of a threshold value must be selected. Resources may include occurrence, CPU time, resident time, wait time, and SQL resident time. Threshold values would depend on the particular type of resource. Upon selection of the resource, as at 230, the system may provide the units to the user for selection of the threshold value. The trap can be applied to any request, to a specific request name, or to a specific method name. The trap then proceeds to monitor the selected resource, as indicated by block 235. If a threshold is met, then the system evaluates whether an alert condition has been triggered, as indicated at blocks 236 and 237. If not, then the event may be logged, as indicated at block 238. If an alert condition is met, then an alert is communicated to a user and recorded, as at 239.

For a second type of software trap, as indicated in blocks 240 and 242, a resource and condition with a number of hits must be selected. To set this type of software trap, the user is prompted to specify a resource and a condition, as at 242. The resource may be, for example, an HTTP request parameter, or an SQL statements. For an HTTP or SQL request, a condition is a specified string contained in the HTTP/SPL request. The condition may also be in the form of a Boolean expression applied to strings. When the user provides the requested resource and condition, at 244, the software trap performs monitoring, as at 246 of FIG. 2B. Whenever a request or statement is identified meeting the condition, a hit counter is incremented, as indicated by blocks 248, 250 and 252 in FIG. 2B. If sufficient hits are counted, then an alert condition is reached, and an alert is communicated and recorded, as at 254.

A third type of trap applies to the condition of the resource consumption of the application server. The user is required to select an application server or group. The user is prompted to specify, for resource and threshold values, a resource, and a threshold, as indicated by blocks 260, 262 and 264 in FIG. 2B. The resources may include information relating to application server availability, database connection pools, and JVM runtime memory. Server availability is measured as a simple positive or negative. As to database connection pools, a number of different thresholds may be set, including: number of connections allocated to number of connections; average number of threads waiting for a connection; average time that a client waits to be granted a connection; number of connection pool timeouts; and average percent of the pool in use. For JVM runtime memory, resources may be the amount of free memory in the JVM runtime and the amount of memory used in the JVM runtime. The user is prompted to provide a number and to indicate whether that number is a maximum or minimum. Suitable units may be provided to the user, e.g., Mbytes for free memory and memory used. The user is also prompted to select the number of times that a condition is met before an alert message is created. The resource is monitored, as indicated at 266, and if an alert condition is met, an alert is communicated and recorded, as shown at 268 and 270.

Alert conditions, which determine under what circumstances an operator is notified of data identified by a trap, will now be described. In operation, when a threshold condition set in a software trap is met, depending on the conditions set by the user, either an alert is sent, or a counter is incremented. If the counter is incremented, then the new count is checked against the threshold. The alert action may take several forms. The alert is preferably logged for audit purposes, including the trap condition, the offending monitored resource, the offending values, and a date/time stamp. A local dump of the offending request, method or thread can be produced, as can access to a display. A stack trace and method trace may be provided. One or more individuals may be notified, such as by e-mail or other message such as an SNMP alert. Escalation of the alerts may be included, for example, by sending an e-mail only after the third occurrence of a threshold. Other examples of multiple actions taken on multiple conditions may readily be envisioned. When a threshold number of hits is detected, the counter is reset to zero. If a Boolean condition has been specified, the condition is reevaluated each time a boundary is met. If a method has been specified, the condition is reevaluated after the method is detected.

A trap/alert log is maintained identifying the entries by date/time stamp, and other information obtained from the alerts. Users may monitor traps while running to view the log and counter. The user may be provided with the capacity to toggle traps between active and inactive status.

Application Performance Analysis

In a method, system and computer program of the invention, the program provides the capacity to obtain performance analysis. Information is provided at a relatively high level, and the user has the option of requesting and receiving more detailed information. Information is provided in a format which will be referred to as a report. In general, the user is prompted to select a type of report, as indicated at 305 in FIG. 3, and a high level report, or trend report, is presented to the user, as indicated at 310. From the trend report, the user is provided with the option of selecting a variety of more detailed reports. The user is given the option to obtain successively more detailed reports. The user has the option of comparing performance data in the report against baseline data from a previous time period. Reports include such information as server availability, server resources, business performance, application performance, and database performance from the perspective of the application.

From the application programmer interface (API) and services provided by a specific application server (e.g., PMI in WebSphere) and the user's applications on which data collectors are operating, data are obtained. The obtained data will be a working set of data. A trend report, which is a selected type of report, may be obtained. Reports are stored on a server group level. Initially, data is obtained, such as from the API and server and the user's applications. The user may be able to determine the amount of application data to be captured. This amount may be expressed as a percentage of the total request samples that should be stored. The user is prompted to select the application server from which the request samples are taken. The user may be prompted to select the frequency, in terms of time periods, such as minutes, that the user wants the system to take a snapshot of the data.

The use of redundant data should be limited. A sampling ratio is defined to determine how much of the data is to be recorded in a performance history database. The user is prompted to set the sampling ratio, thereby limiting the amount of data required for storage in the database. Table 1 shows the metrics, a description of each metric, and the resource from which the data is obtained.

| Metric | Description | Resource |
| --- | --- | --- |
| Response time | The total amount of time, in seconds, required by the entire system to complete a process. | Applications |
| CPU Time | The amount of time, in seconds, required by the CPU to complete a process. | Applications |
| Throughput | The number of requests. This may be expressed in terms of throughput or in a number of requests. Specific throughput metrics are throughput per second, minute, hour, day, and week. | Applications |
| Pool size | Number of available connections in the database pool. | Application servers |
| Concurrent waiters | The number of threads waiting for a database connection. | Application servers |
| Average wait time | The time a client waited to be granted access to the database. | Application servers |
| Faults | The number of connect pool time-outs. | Application servers |
| Percentage pool usage | The percent of the database pool in use. | Application servers |
| Physical connections | The number of physical connections in the J2C pool. | Application servers |
| Connection handles | The number of connection handles in use by the application server. | Application servers |
| JVM free memory | The amount of free memory in the JVM. | Application servers |
| JVM memory used | The amount of used memory in the JVM. | Application servers |
| Availability | The percentage of time a server is available, per the kernel. Where the metric is reporting on a server group, this will be the percentage of the group that is available. | Application servers |

Various types of reports may be provided, including a report type showing trends, and a decompose/decomposition report type on a single data point.

Figure 3:
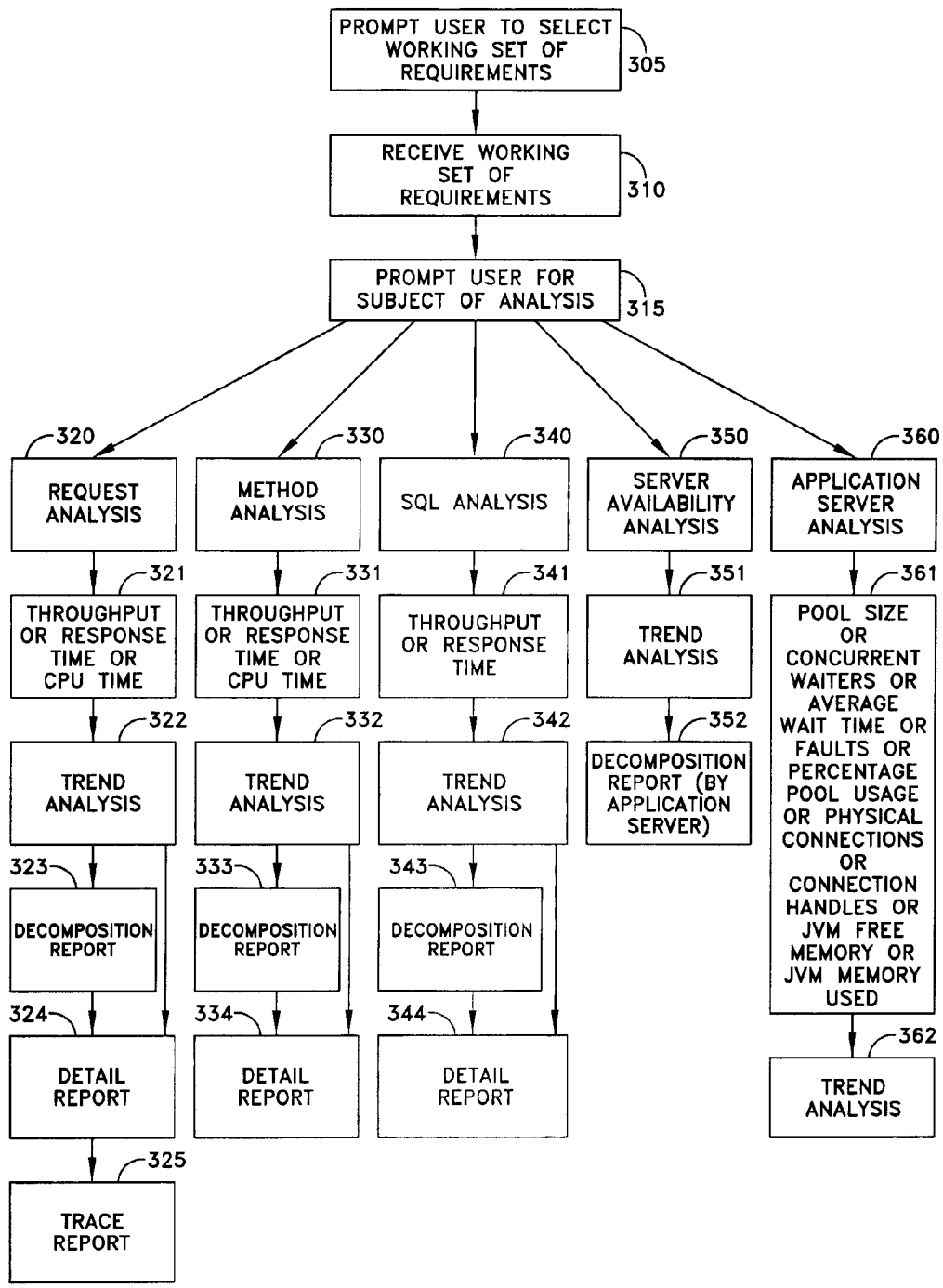
FIG. 3 is a schematic illustration of a method in accordance with the invention.

In one embodiment, illustrated in FIG. 3, the user is prompted to provide certain data for the working set, as indicated at 305, and then provides those data, as indicated at 310. These data include the application server or group, the analysis type, the data period, the data interval, the aggregation period, i.e., the way in which the data is grouped, filtering criteria for selecting data points, the type of analysis, such as request, method, SQL, server availability, and application server analysis, and baseline. The user may then select a type of analysis, as indicated at 315.

If request analysis has been selected, as indicated at 320, users are prompted to select a metric. Examples of metrics are throughput, response time, and CPU time, as indicated at 321. In response to the selection, a trend analysis is provided, with labels indicating the time interval and application server, as indicated at 322. Users may break down the request trend report by request type or request name, or by server name if the report applies to a server group. The foregoing breakdown may be referred to as a decomposition, as indicated at 323. Users may further break down any one portion of the decomposition. Alternatively, from the trend report, users may obtain details on any one data point. This further breakdown may be referred to as the detail report, as indicated at 324. The detail report may further be broken down into a trace report, indicated at 325, on one record of the detail report. The trace report provides method entry and exit information, as well as selected metrics. Thus it can be seen that the user can drill down to further levels of detail.

If a method analysis is selected, as at 330, the user is prompted to select a metric, which may be one of throughput, response time, and CPU time, as indicated at 331. The user is provided the option of limiting the report to such items as a specific request name, request type, or method name. After receiving the selection from the user, the system of the invention generates a report with a trend analysis, as indicated at 332. From the trend report, the user may select a breakdown of the trend analysis by request name or request type. The resulting report will be referred to as a decomposition report for method analysis, as indicated at 333. If applicable, users may decompose a trend analysis report by server, if the report covers a server group. Users may select any portion of the decomposition report for the method analysis for breakdown to detail and view by individual record, or users may select a breakdown of a single data point in the trend report into records. The resulting report is referred to as the detail report, indicated at 334.

If the user selects an SQL analysis report, as at 340, the user is prompted to select one of the metrics of throughput and response time, as at 341. Users may select a specific request name or request type, method name, table name, or SQL call. In response, the system provides a trend analysis, as at 342. The trend analysis may be broken down by request name, request type, method name, and/or table name to provide a decomposition report, as at 343. The report may include the number of samples as a percentage of total. Users may break down any one portion of the decomposition report to obtain detail by individual records, or break down the trend report by a single data point to obtain individual records. The report with individual records is known as the detail report, as at 344.

If the user selects a server availability analysis report, as at 350, a trend analysis is provided, as at 351. No metrics are selected. In a trend report for availability, the system may plot the percent up time of the group over a series of time intervals. The user may break down a trend report for a group by application server, as at 352.

An application server analysis report may be selected as at 360. The user may be prompted to provide one of the following metrics: pool size, concurrent waiters, average wait time, faults, percentage pool usage, physical connections, JVM free memory, and JVM memory used, as at 361. A trend analysis report is provided, as at 362.

Reports may be provided in any suitable manner. Trend reports may be a line graph, with a tablature view of all the data, for each data point. A comparative baseline display may be provided, showing the same data at a selected time past time. For example, baseline data may show the same data for the same time of day on a prior day. For decomposition reports, a bar or pie graph may be furnished, with a tablature view of all data, per type. The user is preferably able to select a portion of the decomposition report to drill down to a detail report. Baseline data may be provided in the detail report for comparison.

Software Consistency Check

In a method, system and program of the invention, comparisons of the operation of applications on various servers may be conducted. Such comparisons are valuable in identifying possible configuration problems in different servers.

Figure 4:
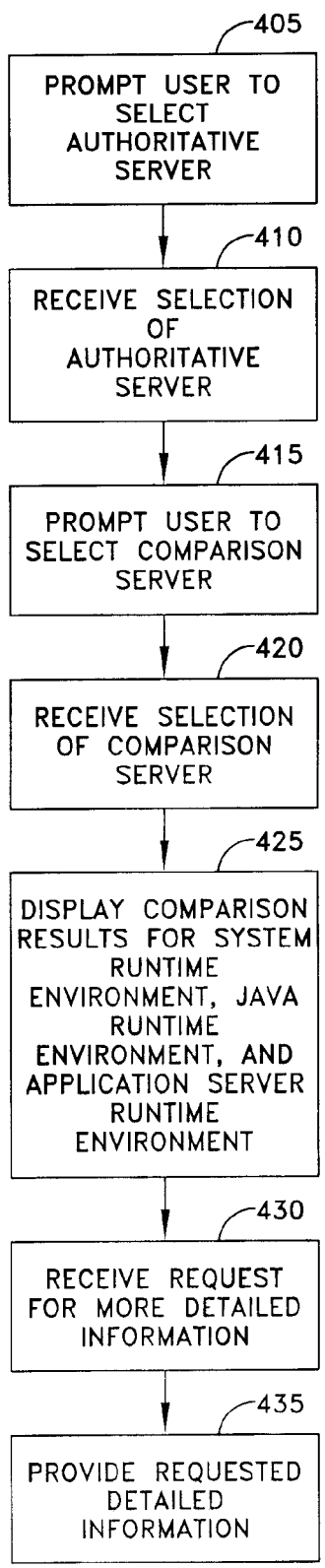
FIG. 4 is a flow diagram illustrating a method in accordance with the invention.

An example of such a comparison is referred to as an n-way diff. As to each server, the program of the invention obtains runtime environment data as to how a system is set up and installed. These environments may be system, java, and application server. For a system, the environment information may include CPU speed, number of CPUs online, number of CPUs offline, memory, operating system version, and physical disk space. Other information may be included. For Java, the information may include JDK version, installation directory, Java policy, operating system information, class path, and library path. For application servers, the information may include the application server, startup directory, listening ports, SSL listening ports, number of registered servlets, number of registered EJBs, number of JDBC connection pools, and number of EARs. The program can prompt a user to select a server as an authoritative server, as indicated in FIG. 4 at 405, receive a selection, as indicated at 410, and then prompt the user to select a server for comparison, as indicated at 415. Once the user selects the server for comparison, as indicated at 420, the system then obtains and displays the comparison results, as indicated at 425. The comparison results may include the runtime environment information noted above. The comparison results may contain only the differing data, and may be graphically represented. The system preferably permits a user to drill down from the displayed results to a detail screen displaying all of the relevant information for each application server, as indicated at 430, 435.

Figure 5:
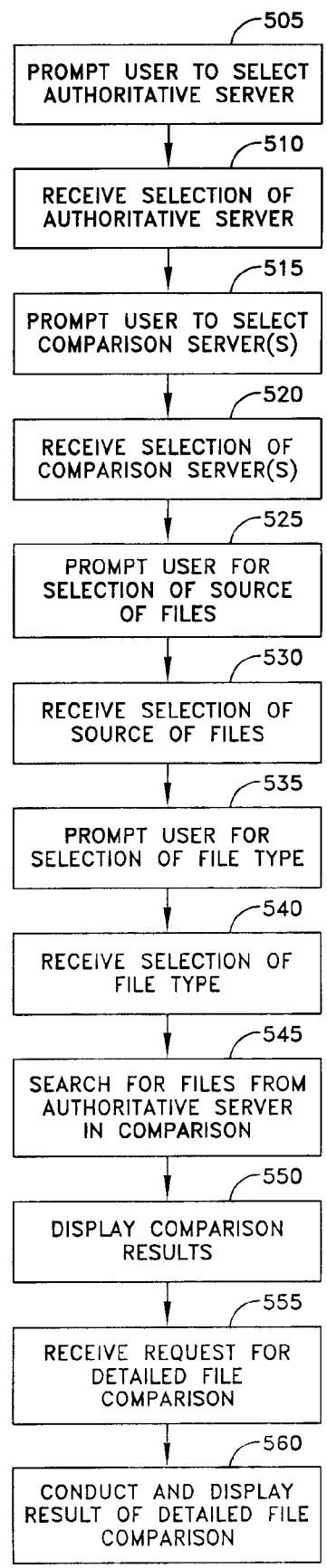
FIG. 5 is a flow diagram illustrating a method in accordance with the invention.

In another type of comparison, comparison of binary files with matching file names can be performed. At a top level analysis, a user is prompted to select one server from a group as an authoritative server, as indicated at 505 in FIG. 5. The user provides a selection, as indicated at 510, and is then prompted to select one or more servers as comparison servers, as indicated at 515. Upon receipt of the comparison server(s) selection, at 520, the user is prompted to select the source of files, as at 525. The user may select from a list of EAR folders, or the CLASSPATH that is deemed to form the master file list of the authoritative server. The user provides the selection, as at 530. The user is also prompted, as at 535, to select one of the file types for the composition of the master file list. The file type is received, at 540. In response, the system starts preparing the master file list from the selected source and file types from the authoritative servers. The system then searches for files listed in the master file list in the comparison servers, as indicated at 545. For each comparison, the results are displayed, at 550. The results may be divided into found files and files not found. For the found category, the list includes matched files, i.e., all files with matched file name, size, and files system timestamp; like folders, i.e., files with matched file name and size, but not timestamp, and unlike folders, i.e., files with matched file name only. For files not found, the files are divided into files in the authoritative server but not the comparison server, and all the files in the comparison server but not the authoritative server. These lists of files are displayed. This display permits the user to readily compare the files in the authoritative and comparison servers.

From this display, the system permits the user to drill down to obtain additional information about the files. The user may select one comparison server, and select one file from the authoritative file, for detailed comparison, as indicated at 555. The system will perform a comparison on the files, with the result being either "same" or "different." The comparison may use a checksum calculation, such as the MD5 algorithm. It should be noted that, in one embodiment, a further level is required for JAR files before the comparison can be run. First, archive files are extracted, and then name matching is performed. Then the comparison may be run. As a result of these comparisons, both the names of the files and the contents of the files are compared between servers, as indicated at 560. Such problems as variant versions and corrupted code can readily be identified.

Request Rewrite.

In a method, system, and program of the invention, a method, system and program may be provided for rewriting or mapping certain requests. In particular, three different types of requests are received in a system of the invention. These are JSPs, servlets, and remote Enterprise Java Bean calls. These requests are typically in the form of strings, and are received from another application, such as a web server or another application server. Such requests are employed in the system of the invention for two different purposes. The requests may be used for identification purposes. The requests may also be used to represent a business request or an application. In general, the implicit dual meanings of a request string are not problematic. However, there are situations in which these dual meanings can create conflicts. For example, in a portal site, request strings in the form of an URL normally look exactly the same, and therefore convenient for the end users to memorize; however, they are deemed to be different types of request by the portal engine using the underlying data object, such as a request or a session object. During problem determination, an operator or administrator will be confused as he will see requests for different functions represented by the same string, with no resolution between the strings. On the other hand, a single application may involve multiple and different request strings and after their successful executions, the resulting performance data is to be analyzed against one application name or label. The problem here again is that there is a lack of a group mechanism for the system to recognize that a group of request strings are related to each other.

Figure 6:
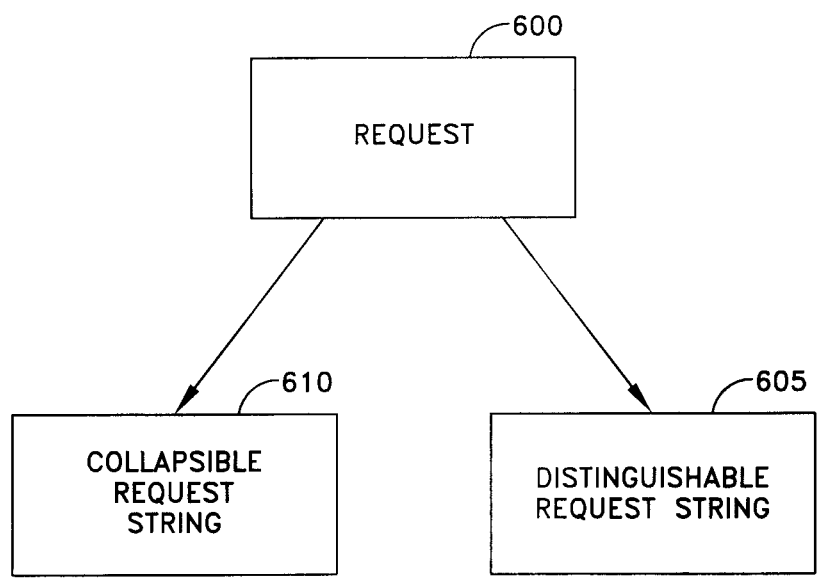
FIG. 6 is a schematic diagram illustrating a feature of the invention.

To overcome the foregoing problems, a module, which may be in the form of Java based logic, may be provided to map requests. As indicated in FIG. 6, each request, such as request 600, is mapped to two separate strings: a distinguishable request string 605, and a collapsible request string 610. These separate strings are used for distinct purposes. These strings may be a distinct URL, or a label string. The mapping or rewriting operation preferably takes place at a point when both problem determination and performance management functions may take advantage of the operation. For example, performance management functions would perform decomposition by request on the collapsible request string. An active request search, used in problem determination, is conducted on distinguishable request strings.

Security

Figure 7:
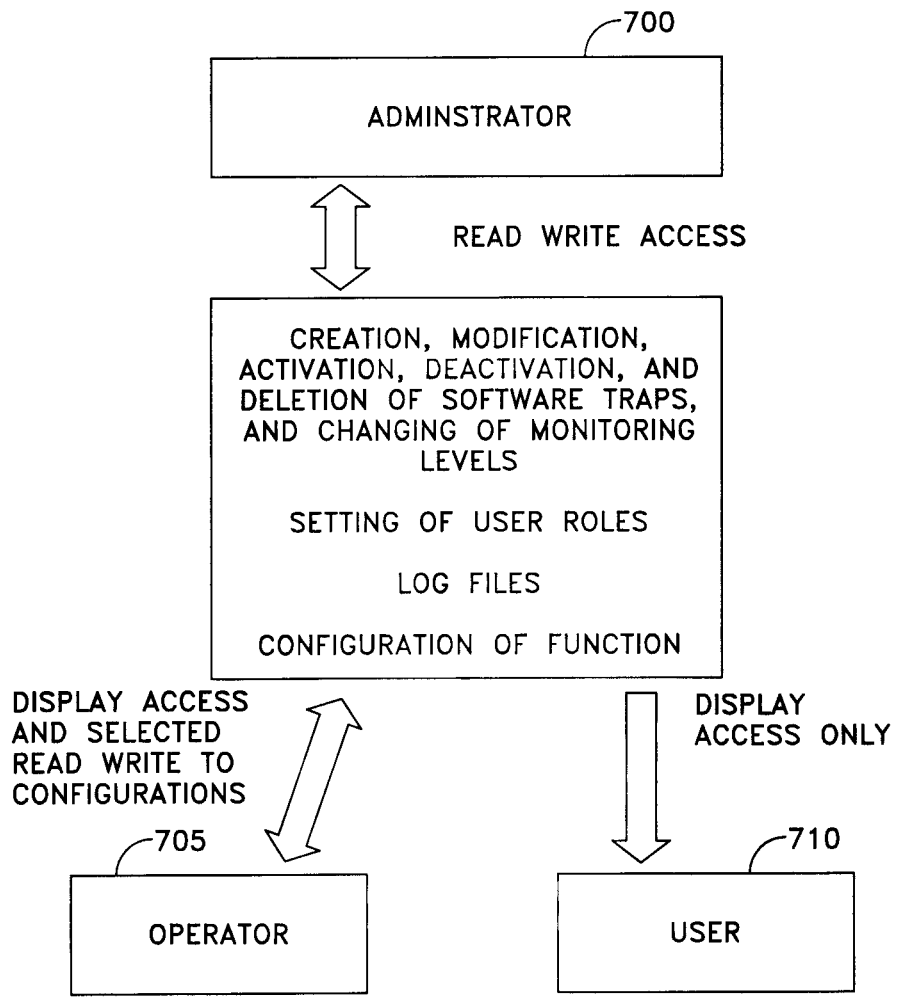
FIG. 7 is a schematic diagram illustrating a feature of the invention.

Security is preferably maintained by providing that each user is assigned to a user role. Each user role is mapped to particular functions of the software of the invention. An access control list may be provided with the mapping between the product functions and the user roles associated with them. An administrator may add user roles and map those roles to functions. Referring to the schematic illustration in FIG. 7, and administrator 700 has read and write access to all functions and configurations, and access to log files. For example, creation, modification, activation, deactivation, and deletion of software traps, and changing of monitoring levels, may be for the administrator only. An operator 705 has display access to most functions, and access to certain function configuration. A user 710 has display access to functions and reports, but not to any function configuration.

Architecture

Figure 8:
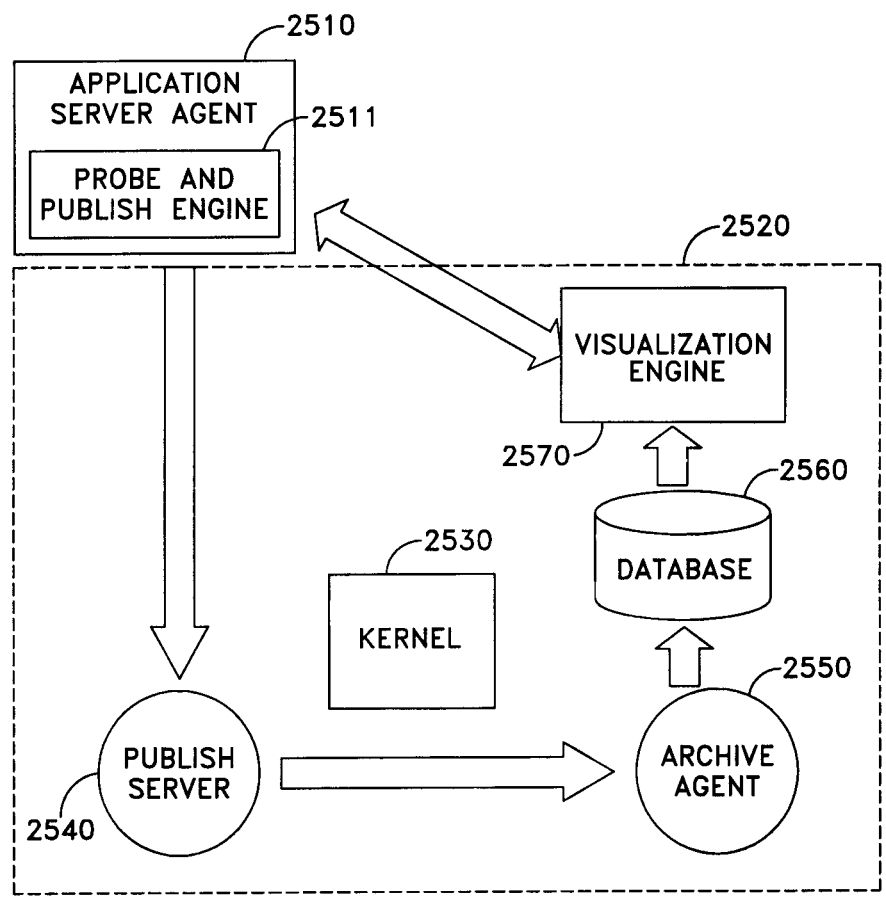
FIG. 8 is a schematic diagram illustrating an exemplary architecture.

The system of the invention may have the architecture described below. The architecture may be in the nature of an agent operating on each application server, and the remaining components on a dedicated server, including a kernel providing central control, a publish server for receiving data from the probe engine, an archive agent for moving data from the cache to a database, a database, a visualization engine for providing all end user applications, and an application server agent for collecting certain application server specific data from an application server (such as Websphere). An exemplary architecture is illustrated at FIG. 8. Application server agents, such as one shown at 2510, are installed on application servers. Probe and publish engine 2511 is the principal component of application server agent 2510. The remaining components may be installed on dedicated server 2520. Kernel 2530 provides central control. Publish server 2540 receives data from application server agent 2510 and moves data to archive agent 2550. Archive agent 2550 moves data to database 2560. Visualization engine 2570 proves all end user applications, and communicates with the database for historical information, and directly with the application server agents 2510 to request and receive snapshot information.

In one embodiment, the source of the data provided to the user in the method described above may be a probe and publish engine. The probe and publish engine obtains all information pertaining to specific threads. In a preferred embodiment, the standard Java profiling interface (JVMPI) may be employed for probe agents.

Figure 9:
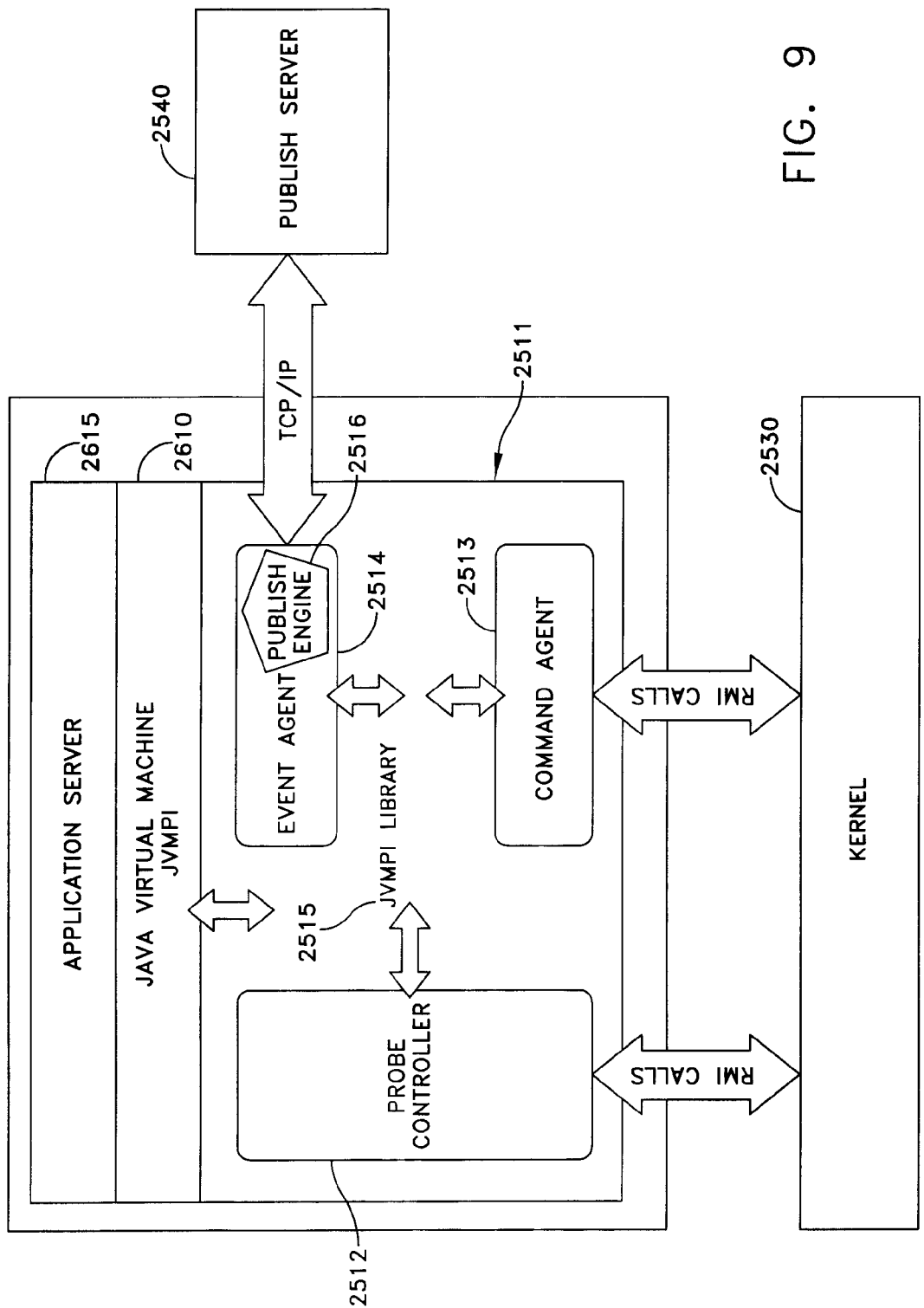
FIG. 9 is a schematic diagram illustrating features of an exemplary architecture.

Referring to FIG. 9, probe and publish engine 2511 is shown in relation to the java virtual machine 2610 with which it communicates, as well as the application server 2615. Probe and publish engine 2511 preferably has five components: the probe controller 2512, command agent 2513, event agent 2514, event handlers 2515, and the publish engine 2516. Probe controller 2512 is a controller thread that controls the life cycle of the other components. Event agent 2514 registers the event handlers for JVMPI events of interest. When such events occur, the handlers are then invoked. The handlers collect the relevant information and add it to an event queue. Publish engine 2516 then obtains the data from the event queue and sends it to the publish server 2540. The agents may be constructed using the standard Java profiling interface provided with Java Development Kit 1.2.2 or above.

In this embodiment, a JVMPI library is loaded with the JVM, and communicates with the JVM, the probe controller, the event agent, and the command agent. JNI functions may be used to capture all event-based data, and date/time stamp, wall clock and CPU clock. Events that are registered by the JVMPI library, event agent, command agent, publish engine, and probe controller, are shown at Table 2:

TABLE 2

|  | JNI/C | Java | Thread |
| --- | --- | --- | --- |
| JVMPI library | Yes | No | No |
| Event Agent | Yes | No | Yes |
| Command Agent | Yes | Yes | Yes |
| Publish Engine | No | Yes | No |
| Probe Controller | Yes | Yes | Yes |

Information obtained from the JVMPI library is stored in an queue, called the event queue, and the event agent retrieves records from the queue, packs them in a packet, and sends them to the publish server via the publish engine. The data collected from the queue by the Event Engine are shown at Table 3:

TABLE 3

| Server Id | | Component Id |
| --- | --- | --- |
| Websphere Admin Node name | | |
| Websphere Application Server Name | | |
| Thread Id | JVMPI | JNI Environment |
| Class Name | JVMPI | Stored in class/method name list of JVMPI Library |
| Method Name | JVMPI | As above |
| Method Signatures | JVMPI | As above |
| Type (Bean/Servlet/JSP/JDBC) | JVMPI | By checking if the class is inherit from a special class |
| Data and Time Stamp | OS | |
| Wall clock | OS | |
| CPU clock | JVMPI | Use JVMPI function getCurrentThreadCpuTime. Only support for IBM Development Kit 1.3 and AIX 5.1 |
| Request [URL] or SQL call | JVMPI | Require converting JVMPI object Id to JVMDI object reference. |

The Command Agent is an RMI service registered with the kernel. The Command Agent receives commands from the visualization engine and other external components and satisfies them using JVMPI or JNI calls. An exemplary list of commands, and whether the commands are provided to the JVMPI or the JNI is shown at Table 4.

TABLE 4

| Stack Trace | JVMPI |
| Session object | JVMPI |
| Request object | JVMPI |
| Suspend thread | JNI |

TABLE 4-continued

| | |
|---|---|
| Hard kill thread | JNI |
| Soft kill thread | JVMPI |
| Change thread priority | JNI |
| Datasource Maximum Connection Pool | JVMPI |
| ORB Pool Size | JVMPI |
| Web Container Pool Size | JVMPI |

Figure 10:
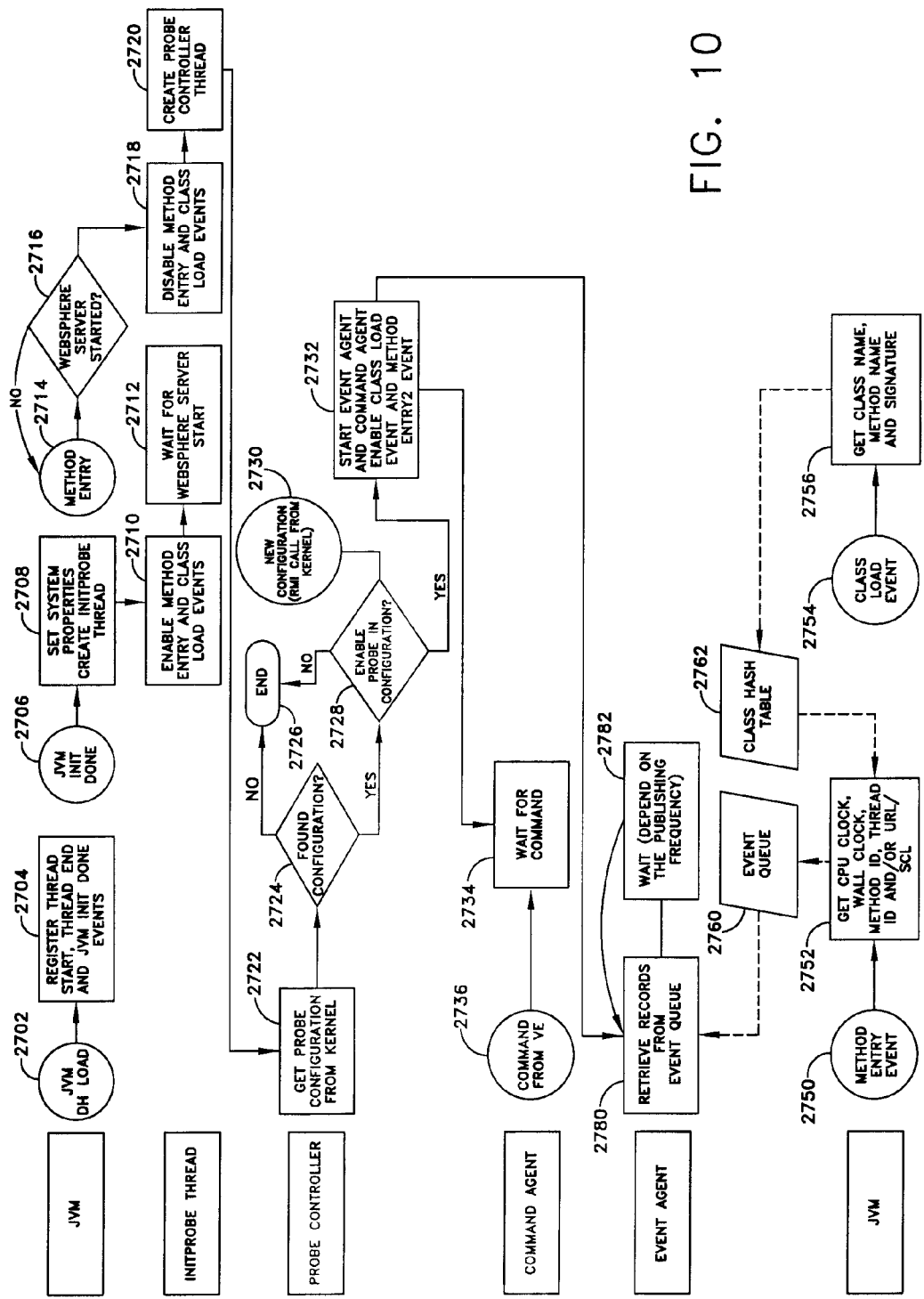
FIG. 10 is a diagram illustrating features of an exemplary architecture.

The probe controller is also preferably an RMI service registered to kernel 2530, and starts and stops other probe components gets the probe's configuration. New configurations of probes are sent from kernel 2530 to the probe controller. The probe controller will determine if a probe should be started or stopped or a filter changed upon receiving a new configuration. A logic diagram for the Probe/Publish Engine is provided as FIG. 10. In accordance with this logic diagram, when the JVM is loaded, at shown at 2702, events identifying thread starts, thread end and completion of initialization of the JVM are registered through JVMPI to the kernel, as shown at 2704. When initialization of the JVM is completed, as indicated at 2706, then the system properties are set and a thread for initiating probes is created, as indicated at 2708. The thread then enables the method entry and class load events, as indicated at 2710, and waits until the application server has started, as shown at 2712. A method entry starts a process flow in the JVM, at 2714, which checks to see if the application server is started, at 2716. If it is started, the process flow is passed to the InitProbe Thread, which disables method entry and class load events, at 2718, and creates a probe controller thread, at 2720. The probe controller thread seeks a probe configuration from the kernel, at 2722. If the probe configuration is not found, then the flow ends, as indicated at 2724 and 2726. If the configuration is found, the process flow proceeds to determination if the probe is enabled in the configuration, at 2728. If not, then the process flow ends. A process flow may also commence with a new configuration in the form of an RMI call from the kernel, as indicated at 2730. If the probe is enabled, then the process flow proceeds to start the event agent and command agent, enable a class load events and a method entry events, as shown at 2732. The command agent awaits a command from the visualization engine, as indicated at 2734 and 2736. The enabling of the method entry event starts a process flow in the JVM, as indicated at 2750. Data, such as CPU clock, wall clock, method identification, thread identification, and/or URL and SQL are obtained, as indicated at 2752, and passed to event queue 2760. The class load event initiates a process flow in the JVM, as shown at 2754. A function of get class name, method name and signature is initiated, as shown at 2756, and this information is passed to class hash table 2762. The event agent retrieves records from the event queue 2760, as indicated at 2780. The event agent will wait depending on the publishing frequency, as indicated at 2782.

Figure 11:
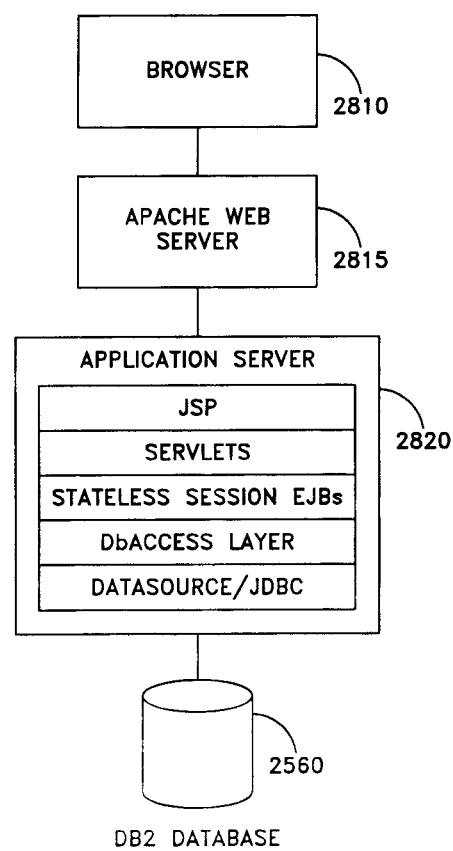
FIG. 11 is a schematic diagram illustrating features of an exemplary architecture.

Visualization engine 2750 provides the front end user interface component used in the method and system of the invention. Standard J2EE technologies may be used for implementation of visualization engine 2750. The front-end framework of visualization engine 2750 handles housekeeping such as session management and security. The visualization engine 2750 preferably handles as many common tasks as possible in order to provide an environment conducive to the development of front-end application and business logic components. The visualization engine 2750 sits on top of a database, which it accesses in response to user requests. The architecture is illustrated at FIG. 11, and is shown to be browser-based, using a browser 2810, communicating with a web server 2815, which may be an Apache web server, and an application server 2820, such as IBM's Websphere, interfacing between the database 2560 and the web server 2815. Servlets may be used to handle requests and manage application flow. Servlets may also be employed to control front-end behavior by performing form data-entry validation and sending java bean objects containing data to JSP pages. JSP pages may handle most of the front-end presentation logic. Business logic may be implemented using enterprise java beans Generally, stateless session beans are used.

Servlets may be used for form-entry data validation, as noted above, and for application logic flow. A base servlet may be provided that all servlet applications must extend. The base servlet sets up global variables, handles authentication and authorization, and performs redirects to login and access-denied pages as necessary. Resource bundle, log message and audit trail message files are provided. The JSP's generate HTML code to render the web page to be displayed in the browser. Servlets pass the desired data to the JSP's using java bean objects.

The top layer of the stateless session beans makes up the API. There may be a layer of enterprise java beans or java classes below the top layer that deals with access to data from the database. Data from the database may be obtained through a database access layer that is part of the DBAccess data access framework.

The application activity display function provides real-time access to data, as noted above, and involves direct communication between the visualization engine and the corresponding publish server and probes. A publish server interface and command agent interface are provided for this direct communication. The stubs to these interfaces are maintained by the kernel, and are retrieved by the visualization engine by performing a lookup from the kernel using a lookup agent helper client. Each server in which probes are running has a unique identification for the probe. Once the probe identification has been obtained, the interface stub of the command agent is obtained from the kernel. The identification of the publish server used by the probe is then obtained from the probe. The corresponding interface stub of the publish server is obtained from the kernel. The list of active requests and associated data can then be obtained directly from the selected publish server. Additional request data can be obtained from the probe directly. Communications between the visualization engine and the command agent and publish server of the probe are real-time and synchronous.

The visualization engine includes the security functions discussed above. A proprietary API was developed because the J2EE specification security features are not sufficient to provide the security features described above. Security features consist of authentication and authorization functions. Authentication is performed via a proprietary Java API that wraps a third party authentication system. Authorization is performed by maintaining access control lists by users or groups. A user is associated with specific groups and can only access data for servers in those groups. Servers are each associated with one or more groups.

Figure 12:
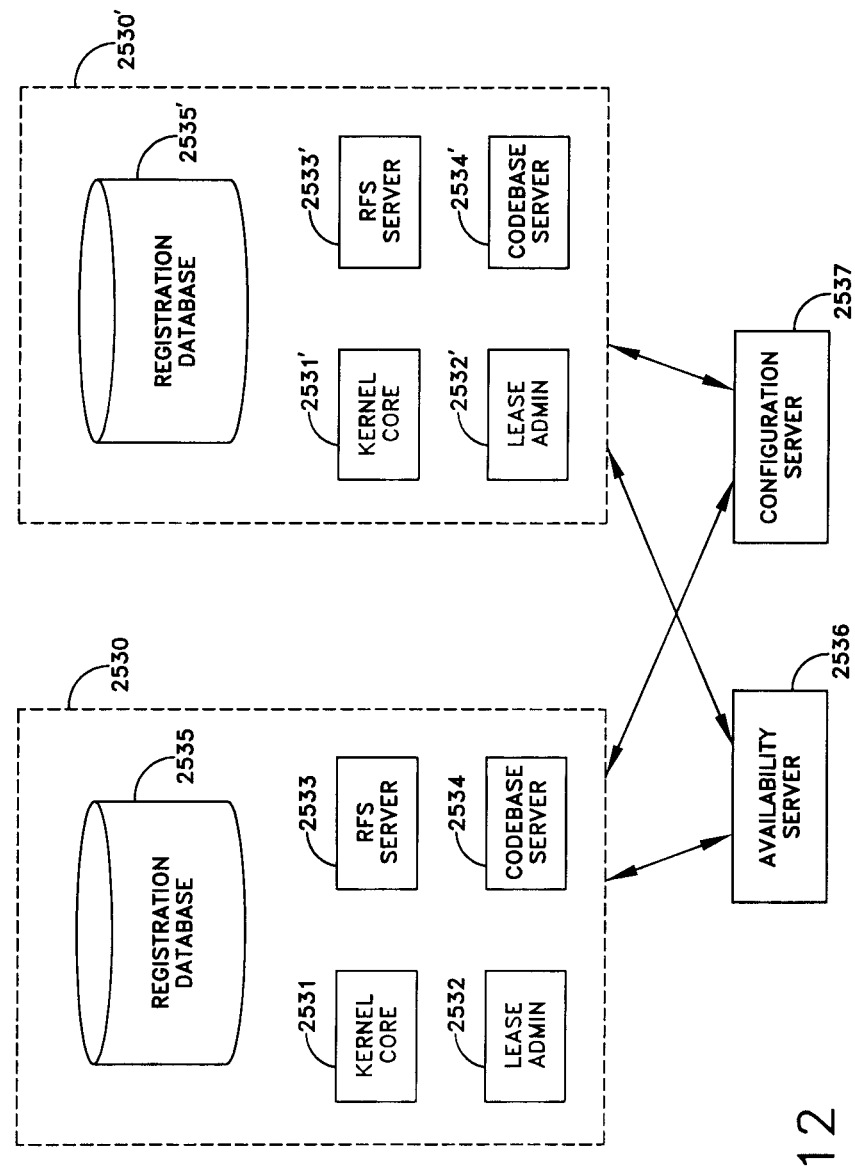
FIG. 12 is a schematic diagram illustrating features of an exemplary architecture.

The kernel will now be described in detail. The kernel enables various services to discover each other on a network and provides a way for services to interact in a dynamic, robust way. No user intervention is required when services are brought on or off line. Services that join the kernel can adapt dynamically when any of the other services go on or off line. Consumers of the services do not need prior knowledge of the service's implementation. Referring to FIG. 12, two instances of the kernel, 2530 and 2530', are shown. The architecture of the kernel 2530 features a core 2531, a lease administrator 2532, an RFS server 2533, a codebase server 2534, a registration database 2535, an availability server 2536, and a configuration server 2537. The architecture of the kernel 2530' features a core 2531', a lease administrator 2532', an RFS server 2533', a codebase server 2534', a registration database 2535', the availability server 2536, and the configuration server 2537. Two instances of the kernel are preferably running on separate servers for enhanced availability.

The kernel core 2531 handles all join, renew, leave and lookup requests from a service. The services are probe agents, the availability server 2536, and the configuration server 2537. For a join request, the service passes a proxy object and its associated service attributes to the kernel. The kernel fulfills the request by storing the proxy object and service attributes in the registration database. When a client needs a certain type of service to accomplish a task, it looks for the service by passing a search template and issuing a lookup request to the kernel. Based on the search template, the kernel will return the corresponding proxy object to the client. Each service is required to renew its lease by issuing a renew request to the kernel periodically. If the kernel does not receive a renew request when required, the kernel removes the service's proxy object and service attributes from the registration database. This renewal requirement avoids requests being sent to services that are unavailable. The probe and publish server preferably bundles the application and system information, such as the volume of completed requests and CPU utilization, when the lease is renewed. The lease concept thus serves to report the availability of the server and high-level statistical information. A service may also issue a leave request to the kernel.

The lease administrator component 2532 keeps track of the records in the registration database. If any registration is expired, or a leave request is received, the lease administrator 2532 causes the corresponding record to be removed so that the kernel will not pass the corresponding proxy object to any clients. The RFS (request for stub) server 2533 listens on a port for connections. When a connection is identified, a serialized stub object of the kernel is sent out to the service or client to use in interfacing with the kernel. The codebase server 2534 is similar to an HTTP server, but provides a facility to allow clients of a service to download the class definitions of the proxy object it obtains from the kernel. The registration database 2535 provides in-memory storage for proxy objects and associated service attributes. Server availability and statistical information resides in the registration database 2535.

The availability server 2536 takes snapshots and stores the history of the registration database 2535 in order to facilitate providing availability of servers and statistical data to the visualization engine 2570.

The configuration server 2537 is a centralized place to store configuration data for all components. Configuration data is in XML form and is kept in the database. Users may change configuration through the visualization engine. When this is accomplished, the configuration server 2537 retrieves from the kernel a list of proxy objects that are adapting to the old configuration. The configuration server 2537 makes use of the proxy objects to broadcast the new configuration. This serves to update the configuration of probes in response to user commands at the visualization engine.

A helper utility, called JoinManager, requests the stub object of the kernel, and joins the kernel with the proxy object as well as its service attributes. If the stub object is not available, the utility will continue to retry until it succeeds. This utility also maintains and renews the lease. A lookup manager utility may be used by a client to look up a specific service.

The publish server 2540 manages data received from the various publish engines. Multiple publish servers may be provided in a single installation. The publish server provides query capabilities for the visualization engines. The publish server also manages the incremental retrievals of performance management related data and system resources related data. The publish server architecture is shown at FIG. 13.

Publish server 2540 may be implemented as a multi-threaded process. Each thread connects to a specific publish engine and receive data from it. It may also contain additional threads to deal with startup, shutdown and communications to the kernel.

Figure 13:
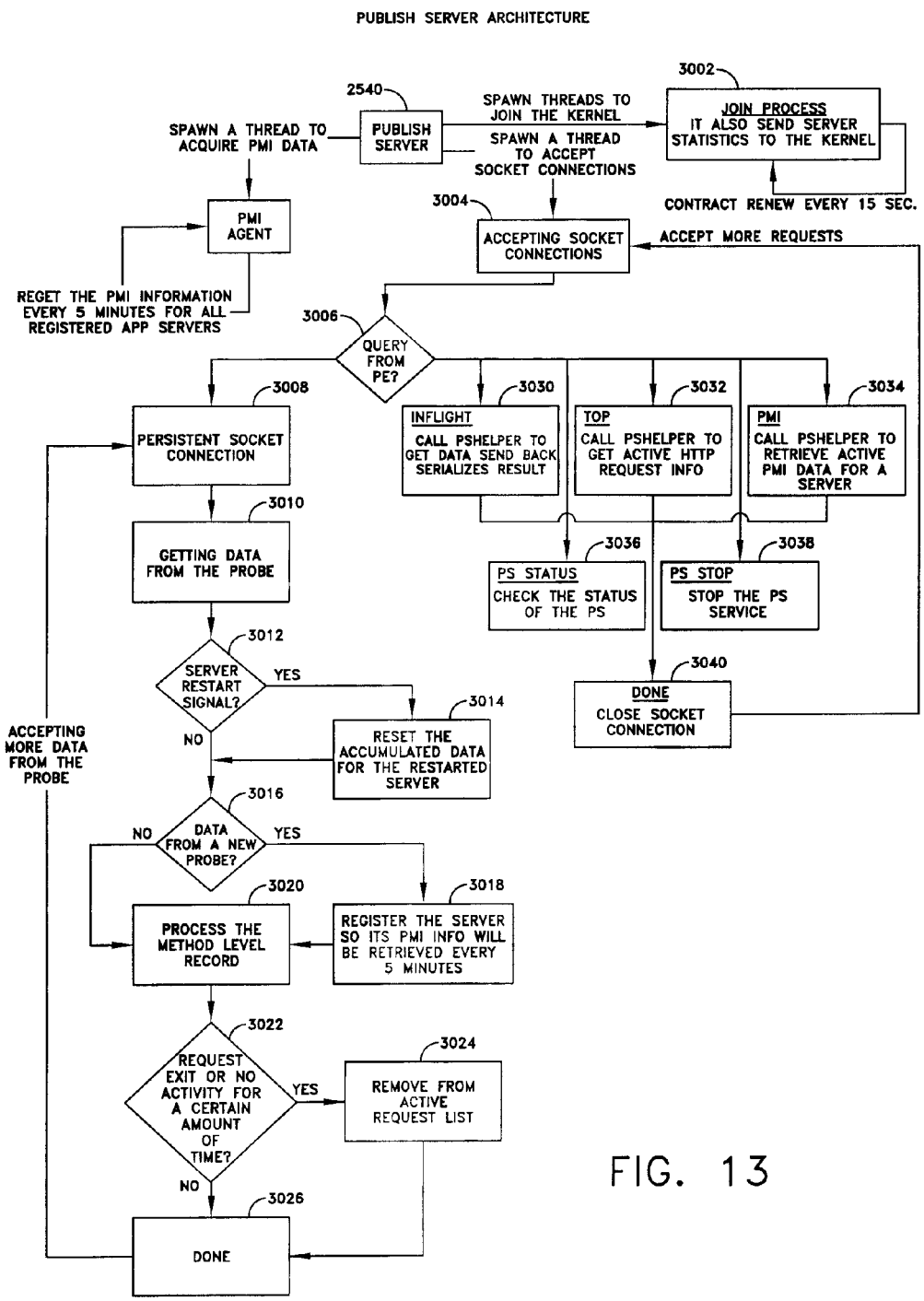
FIG. 13 is flow diagram illustrating an exemplary architecture.

Referring to FIG. 13, publish server 2540 spawns a thread to join the kernel, and regularly renews its contract, as shown at 3002. Publish server 2540 also spawns a thread to accept socket connections, as indicated at 3004. As indicated by decision block 3006, the next step depends on whether a query is received from the corresponding publish engine. If, rather than a query, data is received, a persistent socket connection is established, as indicated at 3008. The data is also associated with a request. Data is then obtained from the probe via the publish engine, as indicated at 3010. If a server restart signal is received, as indicated at 3012 and 3014, then the publish server resets the accumulated data for the restarted server before proceeding. If the data is from a new probe, as indicated at 3016 and 3018, then the server is registered so that the server's performance management related data and system resources related data will be retrieved periodically, such as every 5 minutes. The process flow then proceeds to processing the records, such as method level records, class load records, and GC records, received from the probe, as indicated at 3020. If a request is completed or there is no activity on the request for a certain amount of time, as indicated at 3022, then the request is removed from the active request list, as indicated at 3024. The process flow then returns to accept more data from the probe, as indicated by labeling leading from 3026.

If the data is determined to be a query, then a property may be used to determine the appropriate type of information. Queries may ask for various information, as illustrated at 3030, 3032 and 3034. The result is then serialized and sent back to the publish engine. The publish server also receives certain administration requests made by its clients, such as for status, as indicated at 3036, and stop the service, as indicated at 3038. These tasks can be invoked by administrators. The connection is closed when the information in response to the query has been provided, as indicated at 3040, and the publish server becomes available to accept socket connections again.

It will be understood that the foregoing architecture represents one system having means for carrying out the steps of the method of the invention. The visualization engine comprises means for presenting information to a user, means for prompting a user, and means for receiving requests from a user. The probe engine comprises means for obtaining information regarding distributed applications, and for carrying out filtered monitoring of the distributed applications. It will be understood that the functions of the publish engine, archive, database and kernel cooperate with the visualization engine and the probe engine to provide one means for carrying out the steps of the method.

Self-Diagnosis

In a method, system and computer program of the invention, a method and system may be provided for conducting analysis of internal components of the architecture, and for reporting the results of the analysis to an operator. In an example, there may be provided views of the kernel, of the data collector component, of the publish server, and of the archive agent.

The kernel view indicates all running instances of the kernel component of a software system of the invention. For each instance, there is provided a kernel runtime environment detail and a component overview for each. Exemplary values in a kernel runtime environment detail include the platform, the IP address, various port numbers, a codebase library path, contract renewal interval, the start time, the file where the security policy is resident, driver names, and the URL of its corresponding database. The component overview may include the service name, the component identification, platform, IP address, the listen port number, the first join time, and the last contract renewal time. Each component identification in the component overview section may be a link to provide a corresponding view. For example, if a user clicks a link on component ID X, and its service name is data collector controller, the user is provided with the data collector component view.

A data collector component view displays data pertaining to all up and running data collector controllers. There may be three sections in this view: Data collector controller runtime environment detail, data collector runtime environment detail, and publish server relationship. The first two sections provide configurations and environment in which the data collector controllers are running. The publish server relationship section displays the identity of the publish server to which the data collector is connecting. For the data collector controller runtime environment detail, the identities include component ID, the identity of the admin server, the identity of the application server, the identity of the platform, the IP address, a port number, a start time, the kernel codebase file location, the connected kernel, a configuration profile, whether or not the kernel is configured, and a security policy file. For the data collector runtime environment detail, the information is an identification number of the component, a port number, and whether the component is enabled.

A publish server view provides information as to all up and running instances of the publish server component. For each instance, there may be four sections: publish server runtime environment detail, the data collector relationship, the PMI agent relationship, and the archive agent relationship.

An archive agent view shows all up and running instances of archive agent and for each instance of archive agent, there are two sections of information: the archive agent runtime environment detail, and the publish server relationship. The archive agent runtime environment detail lists the configuration and the environment of the archive agent. The publish server relationship information identifies the publish server that the archive agent is serving.

It will be understood that the foregoing provides real-time monitoring of the system of the invention, so that performance may be monitored and problems determined.

The system of the invention may be installed through installation of certain probe software on a server to be monitored, and a separate server for the remaining software of the invention. This configuration provides for relatively straightforward installation of the system of the invention.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

While the exemplary embodiments have been described with respect to enterprise applications using Java technologies, and specifically J2EE technologies, the methods of the invention may be implemented in other technologies. For example, the methods of the invention may be implemented in other platform-independent technologies. The methods of the invention may also be implemented in other technologies applicable to distributed enterprise applications.

While the invention has been described with reference to preferred embodiments, the invention should not be regarded as limited to preferred embodiments.

What is claimed is:

1. A method for monitoring performance of applications running on a plurality of servers in a distributed computer system, comprising:

for each of the plurality of servers, obtaining runtime environment data as to how a server from the plurality of servers is set up, wherein the runtime environment data is in the form of CPU data, and wherein the CPU data comprises CPU speed, number of CPUs online, number of CPUs offline, memory, operating system version, and physical disk space;

receiving from a user an identification of a server from the plurality of servers as an authoritative server and another server from the plurality of servers as a comparison server;

comparing the runtime environment data of the authoritative server and the runtime environment data of the comparison server to identify configuration problems in one of the authoritative server and the runtime server;

displaying comparison results that provide only differing data between the runtime environment data of the authoritative server and the runtime environment data of the comparison server; and drilling down from the displayed comparison results that provide only the differing data to a detail screen displaying information for the authoritative server and the comparison server.

2. The method of claim 1, wherein the runtime environment data is in the form of one or more of the CPU data, server data, and other data between the selected servers.

3. The method of claim 2, wherein the server data comprises one or more of application server, startup directory, listening ports, SSL listening ports, number of registered servlets, number of connection pools, and number of EARs.

4. The method of claim 2, wherein the other data comprises one or more of installation directory, policy, operating system information, class path, and library path.

5. A system for monitoring performance of applications running on a plurality of servers in a distributed computer system, comprising:

a processor; and a combination of computer hardware and software for:

for each of the plurality of servers, obtaining runtime environment data as to how a server from the plurality of servers is set up, wherein the runtime environment data is in the form of CPU data, and wherein the CPU data comprises CPU speed, number of CPUs online, number of CPUs offline, memory, operating system version, and physical disk space;

receiving from a user an identification of a server from the plurality of servers as an authoritative server and another server from the plurality of servers as a comparison server;

comparing the runtime environment data of the authoritative server and the runtime environment data of the comparison server to identify configuration problems in one of the authoritative server and the runtime server;

displaying comparison results that provide only differing data between the runtime environment data of the authoritative server and the runtime environment data of the comparison server; and drilling down from the displayed comparison results that provide only the differing data to a detail screen displaying information for the authoritative server and the comparison server.

6. The system of claim 5, wherein the runtime environment data is in the form of one or more of the CPU data, server data, and other data between the selected servers.

7. The system of claim 6, wherein the server data comprises one or more of application server, startup directory, listening ports, SSL listening ports, number of registered servlets, number of connection pools, and number of EARs.

8. The system of claim 6, wherein the other data comprises one or more of installation directory, policy, operating system information, class path, and library path.

9. A computer program for monitoring performance of applications running on a plurality of servers in a distributed computer system, the program consisting of instructions stored on a medium, the instructions, when executed on a processor causing the processor to execute:

for each of the plurality of servers, obtaining runtime environment data as to how a server from the plurality of servers is set up, wherein the runtime environment data is in the form of CPU data, and wherein the CPU data comprises CPU speed, number of CPUs online, number of CPUs offline, memory, operating system version, and physical disk space;

receiving from a user an identification of a server from the plurality of servers as an authoritative server and another server from the plurality of servers as a comparison server;

comparing the runtime environment data of the authoritative server and the runtime environment data of the comparison server to identify configuration problems in one of the authoritative server and the runtime server;

displaying comparison results that provide only differing data between the runtime environment data of the authoritative server and the runtime environment data of the comparison server; and drilling down from the displayed comparison results that provide only the differing data to a detail screen displaying information for the authoritative server and the comparison server.

10. The computer program of claim 9, wherein the runtime environment data is in the form of one or more of the CPU data, server data, and other data between the selected servers.

11. The computer program of claim 10, wherein the server data comprises one or more of application server, startup directory, listening ports, SSL listening ports, number of registered servlets, number of connection pools, and number of EARs.

12. The computer program of claim 10, wherein the other data comprises one or more of installation directory, policy, operating system information, class path, and library path.

* * * * *